United States Patent
Beak et al.

(10) Patent No.: US 9,726,323 B2
(45) Date of Patent: Aug. 8, 2017

(54) FLUID CONTAINMENT APPARATUSES AND WALL SUPPORTS FOR FLUID CONTAINMENT APPARATUSES

(71) Applicant: BASIC CONCEPTS, INC., Anderson, SC (US)

(72) Inventors: Todd David Beak, Anderson, SC (US); Kurt William Johnson, Anderson, SC (US); Russell J. Guffee, Pendleton, SC (US); Thomas M. Ricciuto, Aiken, SC (US); Michael David Horning, Irmo, SC (US); Craig J. Cochran, Atlanta, GA (US); Ellen Yea-Yi Brown, Marietta, GA (US)

(73) Assignee: BASIC CONCEPTS, INC., Anderson, SC (US)

( * ) Notice: Subject to any disclaimer, the term of this patent is extended or adjusted under 35 U.S.C. 154(b) by 31 days.

(21) Appl. No.: 14/666,780

(22) Filed: Mar. 24, 2015

(65) Prior Publication Data
US 2016/0281924 A1    Sep. 29, 2016

(51) Int. Cl.
*F16N 31/00* (2006.01)
*F16M 11/10* (2006.01)

(52) U.S. Cl.
CPC ........... *F16N 31/006* (2013.01); *F16M 11/10* (2013.01)

(58) Field of Classification Search
CPC ...... F16N 31/006; F16N 31/002; F16N 31/00; B65D 90/24; B65D 90/205; B65D 11/1833; B65D 1/42
See application file for complete search history.

(56) References Cited

U.S. PATENT DOCUMENTS

| | | | |
|---|---|---|---|
| 5,090,588 | A | 2/1992 | Van Romer et al. |
| 5,316,175 | A | 5/1994 | Van Romer |
| 5,351,837 | A | 10/1994 | Smith |
| 5,762,233 | A | 6/1998 | Van Romer |
| 5,800,091 | A | 9/1998 | Van Romer |
| 5,924,461 | A * | 7/1999 | Shaw .................... F16N 31/006 141/86 |
| 5,928,751 | A | 7/1999 | Van Romer |
| 5,948,250 | A | 9/1999 | Middleton |
| 6,688,516 | B1 | 2/2004 | Ussen |
| 6,880,720 | B2 | 4/2005 | Van Romer |
| 7,036,676 | B2 * | 5/2006 | Christensen .......... E04H 4/0056 220/565 |
| 7,188,747 | B2 | 3/2007 | Bennett et al. |
| RE39,971 | E | 1/2008 | Van Romer |
| 7,374,062 | B2 | 5/2008 | Van Romer |
| 7,506,777 | B2 | 3/2009 | Ramp et al. |
| 7,624,887 | B2 | 12/2009 | Avery |
| 8,562,251 | B2 | 10/2013 | Beak et al. |

(Continued)

OTHER PUBLICATIONS

PCT International Search Report Jan. 29, 2016; 18 pages.

*Primary Examiner* — Shawn M Braden
(74) *Attorney, Agent, or Firm* — J. Bennett Mullinax, LLC

(57) ABSTRACT

A fluid containment apparatus with a floor and a side wall is provided. A wall support is included that supports the side wall and can be moved between a supporting position and a collapsed position. The side wall is movable from a containment position to a collapsed state to allow access for vehicles or other objects to the floor. The wall support and side wall are subsequently movable back to their containment and supporting positions.

20 Claims, 21 Drawing Sheets

(56) References Cited

U.S. PATENT DOCUMENTS

| | | | |
|---|---|---|---|
| 8,955,703 | B2 | 2/2015 | Mcatarian et al. |
| 2004/0118844 | A1 | 6/2004 | Bennett et al. |
| 2005/0205153 | A1 | 9/2005 | MacDonald |
| 2007/0278224 | A1 | 12/2007 | Van Romer |
| 2009/0175684 | A1* | 7/2009 | Barrett ................. B65D 90/205 405/52 |
| 2010/0028081 | A9 | 2/2010 | Barrett et al. |
| 2013/0240538 | A1 | 9/2013 | Beak et al. |
| 2016/0185523 | A1 | 6/2016 | Starr et al. |

* cited by examiner

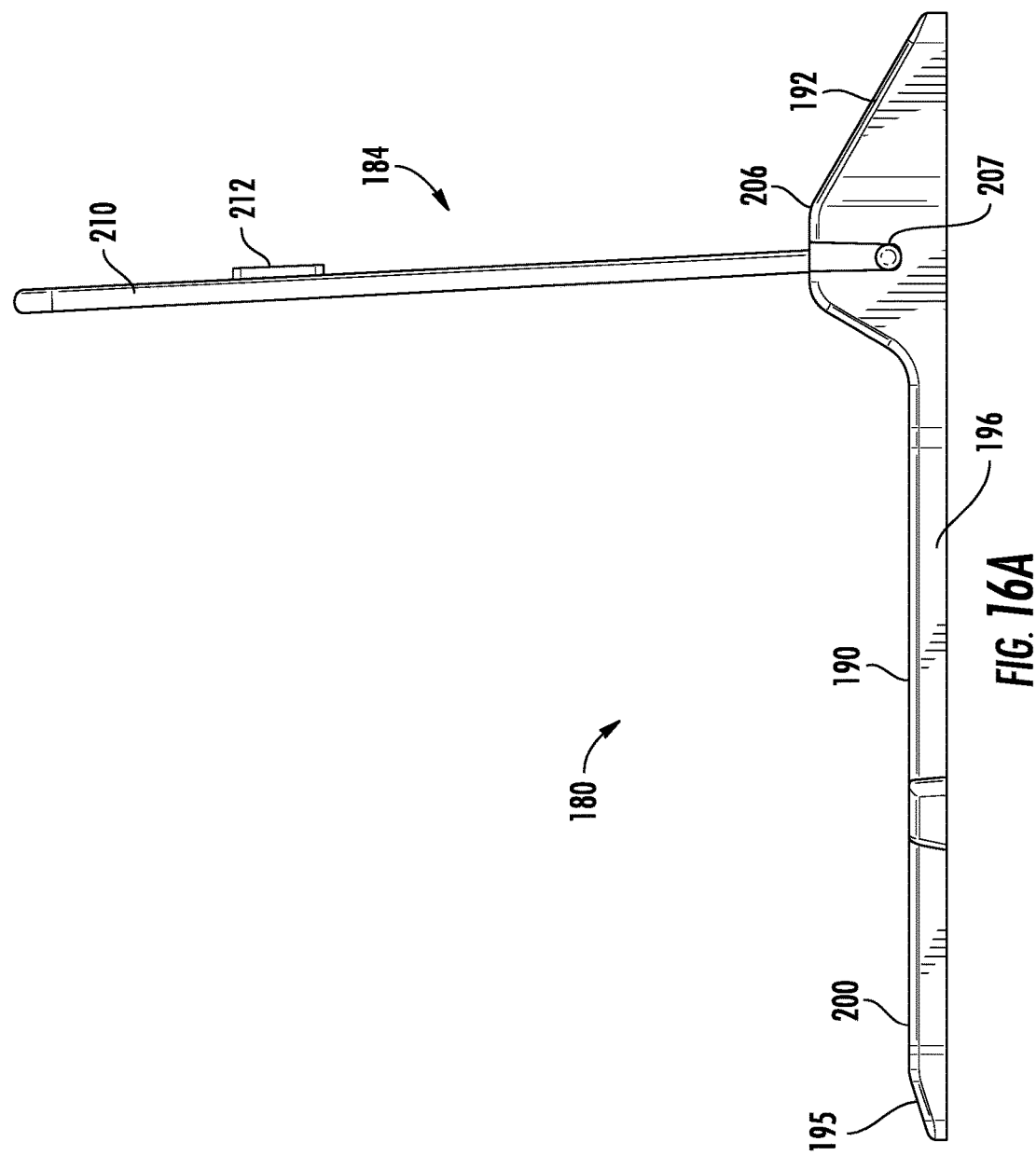

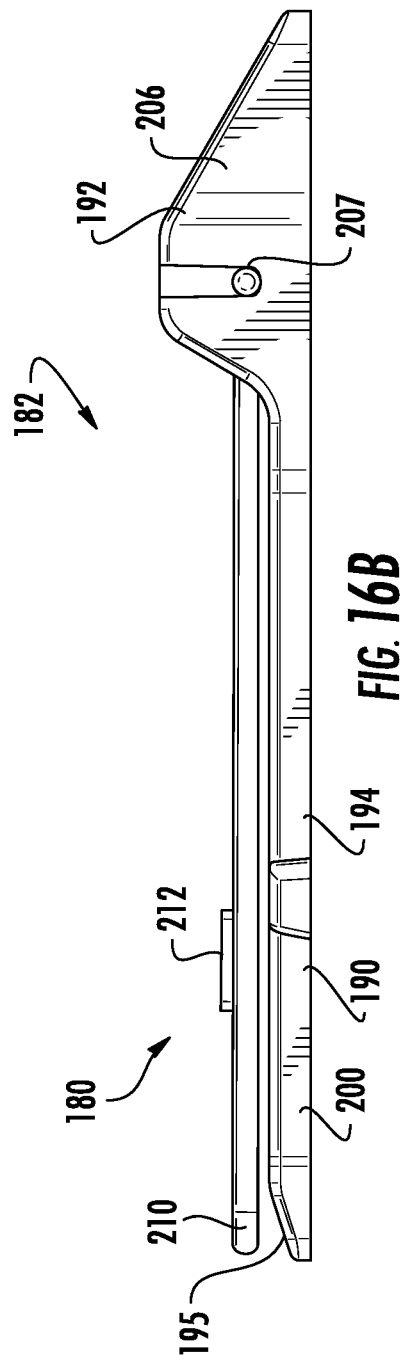

FLUID CONTAINMENT APPARATUSES AND WALL SUPPORTS FOR FLUID CONTAINMENT APPARATUSES

TECHNICAL FIELD

The subject matter disclosed herein relates generally to fluid containment apparatuses that can be used to capture fluid that is spilled or otherwise released during a maintenance procedure or other activity. More particularly, the present subject matter relates to fluid containment apparatuses and wall supports for such fluid containment apparatuses that can be lowered to allow a side wall of such fluid containment apparatuses to be lowered to facilitate entry or exit of a vehicle or other object onto the floor of the apparatus.

BACKGROUND

Portable, foldable containment devices are known for use in acting as a primary or secondary containment barrier to capture spills or run-offs of hazardous chemicals such as petrochemicals. The containment device generally includes a floor surrounded by a side wall that is supported by a number of wall supports. The containment device may be constructed in order to allow a vehicle, such as a tanker truck, to be driven into the containment device so that a maintenance or transfer procedure can be completed. The side wall must be capable of being disassembled, folded, or otherwise opened to allow the vehicle to enter the containment device and to subsequently exit the containment device.

The wall supports may be straps that can be situated against either the outside exterior surface of the side wall or against the interior surface of the side wall. The straps can give or flex when a vehicle is pushed against the side wall in order to allow the side wall to collapse so that the vehicle can then enter the containment device.

Another type of wall support includes a flexible hinge that is located outside of the containment area. The wall support can be anchored to a skirt that completely surrounds the side wall. An upper support member can be attached to the hinge and to the side wall in order to support the side wall. The hinge may be biased to an initial at rest position in which the side wall is supported by the upper support member. When a vehicle pushes against the side wall, the hinge will flex so that the upper support member is pressed flat. Once the vehicle drives over the side wall and is located within the containment area, the biased hinge will spring back into its initial position and thus the upper support member and the side wall will likewise move back into its rest position. Once the maintenance, transfer, or other procedure is finished, the vehicle can be driven back against the interior surface of the side wall. The biased hinge is capable of flexing 180° so that it can flex outwards towards the skirt so that the upper support member and the side wall can flex away from the containment area to allow the vehicle to exit the containment area. Although capable of supporting a side wall and allowing the side wall to collapse, current arrangements are not robust in that they require a hinge that is biased and is capable of flexing a great amount. As such, there remains room for variation and improvement within the art.

SUMMARY

It is an object of the present disclosure to provide novel fluid containment apparatuses and wall supports for fluid containment apparatuses. More specifically, the subject matter disclosed herein relates to fluid containment apparatuses and wall supports for such fluid containment apparatuses that can be lowered to allow a side wall of such fluid containment apparatuses to be lowered to facilitate entry or exit of a vehicle or other object onto the floor of the apparatus.

While a few objects of the presently disclosed subject matter have been stated hereinabove, which can be achieved in whole or in part by the presently disclosed subject matter, other objects will become evident as the description proceeds when taken in connection with the accompanying drawings as best described hereinbelow.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended Figures in which:

FIG. 16A illustrates a side view of the embodiment of the wall support according to FIG. 15 with the wall support in a supporting position;

FIG. 16B illustrates a side view of the embodiment of the wall support according to FIG. 15 with the wall support in a collapsed position;

Figure 1:
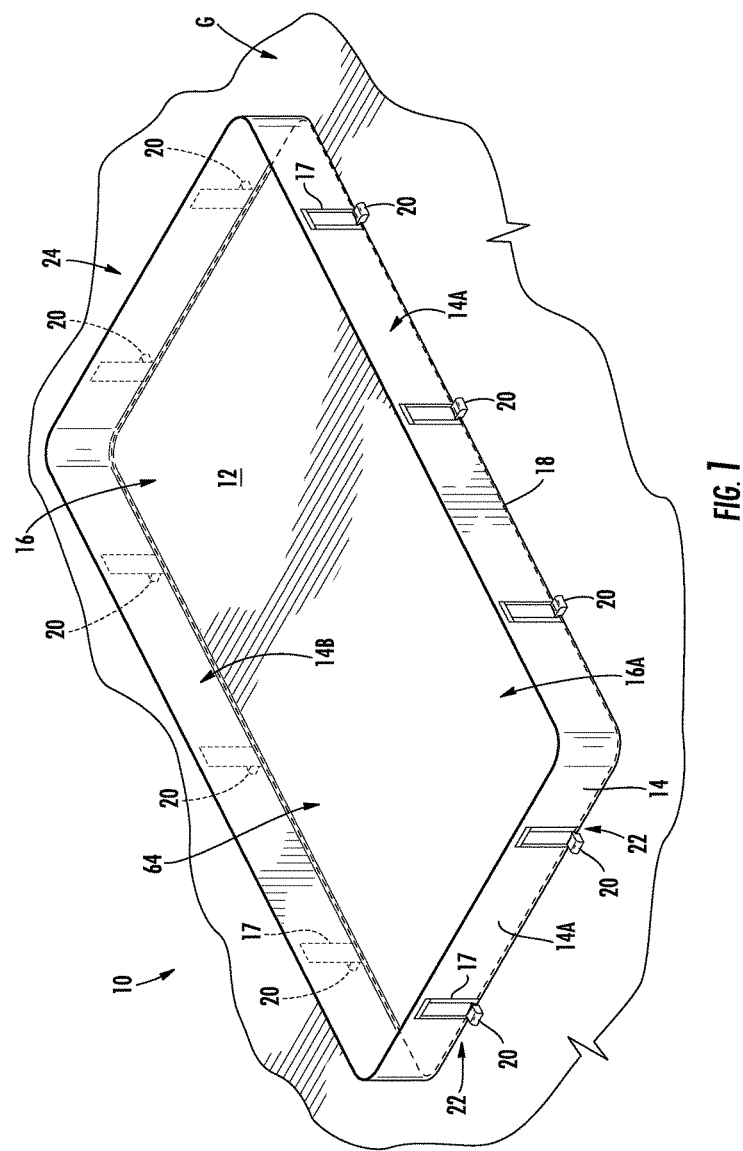
FIG. 1 illustrates a perspective view of an embodiment of a fluid containment apparatus in accordance with the subject matter disclosed herein.

Repeat use of reference characters in the present specification and drawings is intended to represent the same or analogous features or elements of the invention.

DETAILED DESCRIPTION

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

Although the terms first, second, right, left, front, back, etc. may be used herein to describe various features, elements, components, regions, layers and/or sections, these features, elements, components, regions, layers and/or sections should not be limited by these terms. These terms are only used to distinguish one feature, element, component, region, layer or section from another feature, element, component, region, layer or section. Thus, a first feature, element, component, region, layer or section discussed below could be termed a second feature, element, component, region, layer or section without departing from the teachings of the disclosure herein.

Similarly, in the present disclosure, when a feature, element, component, region, layer and/or section is being described as "top", "bottom," "front," "rear," "side," etc., it should be understood that such terms are relative and not absolute. Thus, something that is described with the adjective of "top" may also be considered on a side or a bottom depending on the orientation of the larger subject being described. Additionally, when a feature, element, component, region, layer and/or section is being described as "under," "on," or "over" another feature, element, component, region, layer and/or section, it is to be understood that the features, elements, components, regions, layers and/or sections can either be directly contacting each other or have another feature, element, component, region, layer and/or section between them, unless expressly stated to the contrary. Similarly, directional movement, such as "back and forth," "forward," "backward," "up," "down," or the like are to be understood as relative descriptions that can change depending on the orientation of the subject matter relative to the viewer. Thus, these terms are simply describing the relative position of the features, elements, components, regions, layers and/or sections to each other and do not necessarily mean an absolute position or direction since the relative position above or below depends upon the orientation of the subject matter to the viewer.

Embodiments of the subject matter of the disclosure are described herein with reference to schematic illustrations of embodiments that may be idealized. As such, variations from the shapes and/or positions of features, elements or components within the illustrations as a result of, for example but not limited to, user preferences, manufacturing techniques and/or tolerances are expected. Shapes, sizes and/or positions of features, elements or components illustrated in the figures may also be magnified, minimized, exaggerated, shifted or simplified to facilitate explanation of the subject matter disclosed herein. Thus, the features, elements or components illustrated in the figures are schematic in nature and their shapes and/or positions are not intended to illustrate the precise configuration of a fluid containment apparatus or wall support and are not intended to limit the scope of the subject matter disclosed herein.

It is to be understood that the ranges mentioned herein include all ranges located within the prescribed range. As such, all ranges mentioned herein include all sub-ranges included in the mentioned ranges. For instance, a range from 100-200 also includes ranges from 110-150, 170-190, and 153-162. Further, all limits mentioned herein include all other limits included in the mentioned limits. For instance, a limit of up to 7 also includes a limit of up to 5, up to 3, and up to 4.5.

Figure 2:
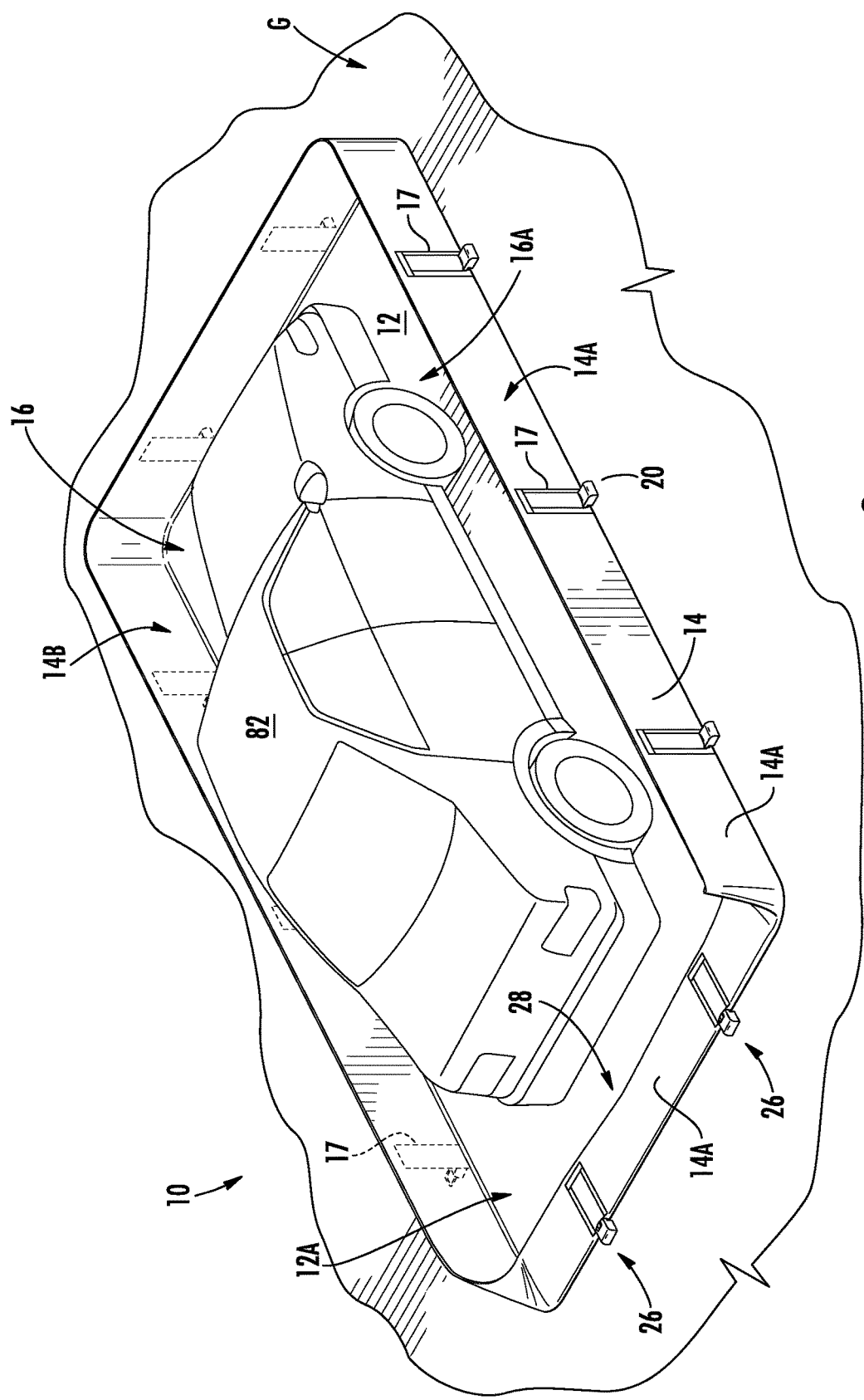
FIG. 2 illustrates a view of the fluid containment apparatus according to FIG. 1 in which a side wall is lowered into a collapsed state.

Referring to FIGS. 1 and 2, a fluid containment apparatus 10 is provided that is used to hold fluid that may be released when a vehicle or other objects such as storage drums are located within the fluid containment apparatus 10 and are worked upon. The fluid containment apparatus 10 is also useful for applications involving mobile storage tankers. Mobile storage tankers and similar units, upon failure of a valve or seal, may result in a significant loss of the fluid contents. For example, oil that is inadvertently spilled from a tanker or during an oil change or transfer from a vehicle can be contained by the apparatus 10 and prevented from damaging the ground G, floor of a building, or other surface onto which the apparatus 10 is located. The fluid containment apparatus 10 can comprise a floor 12 and a side wall 14. One or more wall supports 20 can be included in order to hold the side wall 14 in an upright position.

A vehicle 82 can be driven over the side wall 14 and this force may be sufficient to allow the wall support 20 to move into a collapsed position, or first position, 26 along with the side wall 14 being moved to a collapsed state 28. The vehicle 82 can then be located at the center of the upper surface of the floor 12 and maintenance or other procedures can be imparted thereto. The side wall 14 can remain in the collapsed state 28 even after the weight of the vehicle is removed. The user may manually pull the wall support 20 back into a supporting position, or second position, 22 so that the side wall 14 is likewise moved into an upright position. The wall support 20 may be constructed so that it can move from a supporting position 22 to a collapsed position 26 and back, but not beyond the supporting position 22. In some embodiments, the wall support 20 can be moved between a supporting position 22 to a first collapsed position 26 and between a supporting position 22 to a second collapsed position (not shown) that is about 180° from the first collapsed position 26.

The fluid containment apparatus 10 includes the floor 12 that has an outer perimeter 18 and that is surrounded by the side wall 14. The side wall 14 may extend completely around the outer perimeter 18 of the floor 12, or may extend around only a portion of the outer perimeter 18 of the floor 12 in other arrangements. The side wall 14 and floor 12 may be integrally formed with one another or may be separate components. Further, the side wall 14 itself and the floor 12 itself may be made of a single piece or may be formed of multiple pieces in other arrangements. The floor 12 and side wall 14 can be made of a flexible, liquid impermeable material that has good durability and chemical resistance characteristics. In accordance with one exemplary embodiment, the floor 12 and side wall 14 may both be made of a modified vinyl or polyurethane coated woven synthetic fabric. However, it is to be understood that the floor 12 and the side wall 14 can be made out of various materials in other exemplary embodiments and further may each be made out of different materials from one another.

The side wall 14 is positioned in an upright manner such that the side wall 14 and the floor 12, in particular an upper surface 12A (see FIG. 2) of the floor 12, define a containment area 16 of the fluid containment apparatus 10. The containment area 16 is a space that represents the holding capacity of fluid of the fluid containment apparatus 10. Fluid may thus be dispensed into the containment area 16 and held therein. The containment area 16 has an open top 16A. In this regard, the entire top of the containment area 16 is open. However, other arrangements are possible in which a top is included and covers some or all of the containment area 16. A plurality of wall supports 20 are located around the exterior of the side wall 14 and function to hold the side wall 14 in the containment position 24 as illustrated in FIG. 1. Any number of wall supports 20 can be used to hold the side wall 14 in the containment position 24. For example, from 1-5, from 6-10, from 11-30, or up to 100 wall supports 20 may be used in various exemplary embodiments. While the fluid containment apparatus 10 may have a plurality of side walls 14, only a single side wall is required to have the wall supports 20. The remaining side walls 14 may be supported by other conventional supports. In addition, only a portion of side wall 14 needs to define the wall supports 20. Other portions of side wall 14 may employ other forms of wall supports including but not limited to those as seen in U.S. Pat. Nos. 5,316,175; 5,762,233; and 6,880,720 and which are incorporated herein by reference.

In use, a vehicle 82 can be driven to a position proximate the fluid containment apparatus 10. Force can be applied to the side wall 14 and/or to one or more wall supports 20 that hold the portion of the side wall 14. This force may be exerted by a user pressing or pulling on the side wall 14 and/or the wall supports 20. Such force will cause the wall support 20 or wall supports 20 to be moved from the initial supporting position 22 illustrated in FIG. 1 to a collapsed position 26 as shown in FIG. 2. The attached side wall 14 is likewise moved to a collapsed state 28 from the containment position 24 due to the movement of the wall support 20 or wall supports 20 via the applied force. The vehicle 82 can then be driven onto the upper surface 12A of the floor 12 and located at a desired position on the floor 12. A user may subsequently apply a returning force to the wall support 20 or wall supports 20 to return them to the initial supporting position 22 shown in FIG. 1. This returning force, like the initial force, may be asserted by a user simply grasping the wall support 20 or wall supports 20 and pushing or pulling with his or her hand. Again, the side wall 14 will likewise be moved back to the containment position 24 shown in FIG. 1 upon the application of the returning force. Any portion of a single side wall 14 can be moved into the collapsed state 28 while any remaining amount of the side wall 14 remains in the initial containment position 24. In some arrangements, the entire side wall 14 is moved into the collapsed state 28. The fluid containment apparatus 10 can be manipulated so that a sufficient portion of the side wall 14 is moved to the collapsed state 28 to allow the vehicle 82 or other object to be positioned into and removed from the fluid containment apparatus 10 while the rest of the side wall 14 remains in the initial containment position 24.

Once the side wall 14 is returned back to the initial containment position 24, the maintenance procedure can be conducted on the vehicle 82 and any spilled fluid can be held within the containment area 16. Upon completion of the maintenance procedure, the fluid can be removed and a portion of the side wall 14 can be returned to the collapsed state 28 in order to allow the vehicle 82 to be driven or otherwise pushed from the floor 12. The user may manually apply sufficient force to cause the wall support 20 to be moved to the collapsed position 26 and hence allow the side wall 14 to be moved to the collapsed state 28 to facilitate removal of the vehicle 82.

All of the wall supports 20 of the fluid containment apparatus 10 may be capable of moving from an initial supporting position 22 to a collapsed position 26 and back. Alternatively, only some of the wall supports 20 may be capable of this repositioning while the rest of the wall supports 20 are not capable of the described repositioning. For example, the fluid containment apparatus 10 may be designed so that the vehicle 82 is to enter and leave from a single side of the apparatus 10. In this regard, the wall supports 20 holding up this single side of the apparatus 10 may be capable of repositioning while the rest of the wall supports 20 are not capable of repositioning because the portions of the side wall 14 held by these wall supports 20 do not need to collapse. In other arrangements, the wall supports 20 at opposite ends of the apparatus 10 may be capable of being repositioned to allow the vehicle 82 to enter and exit at either end. As such, it is to be understood that all of the wall supports 20 may be made in an identical manner to one another in some embodiments, while in other embodiments not all of the wall supports 20 are made in the same way.

Figure 3:
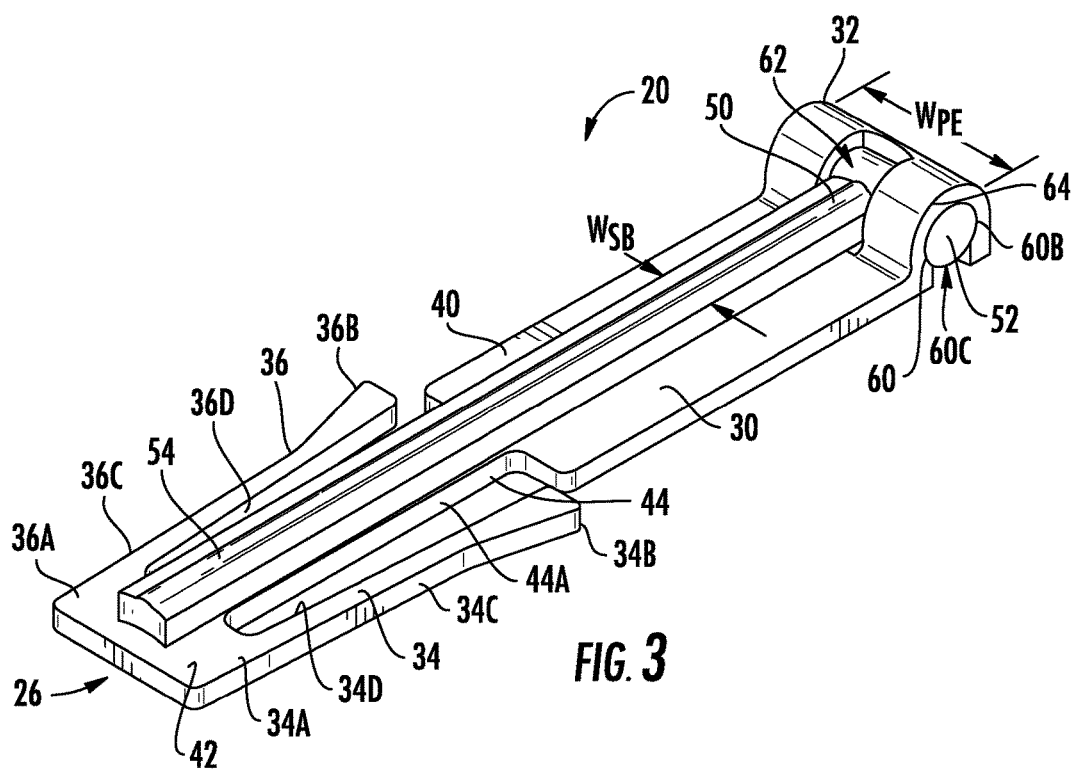
FIG. 3 illustrates a perspective view of an embodiment of a wall support in accordance with the subject matter disclosed herein with the wall support in a collapsed position.
Figure 4:
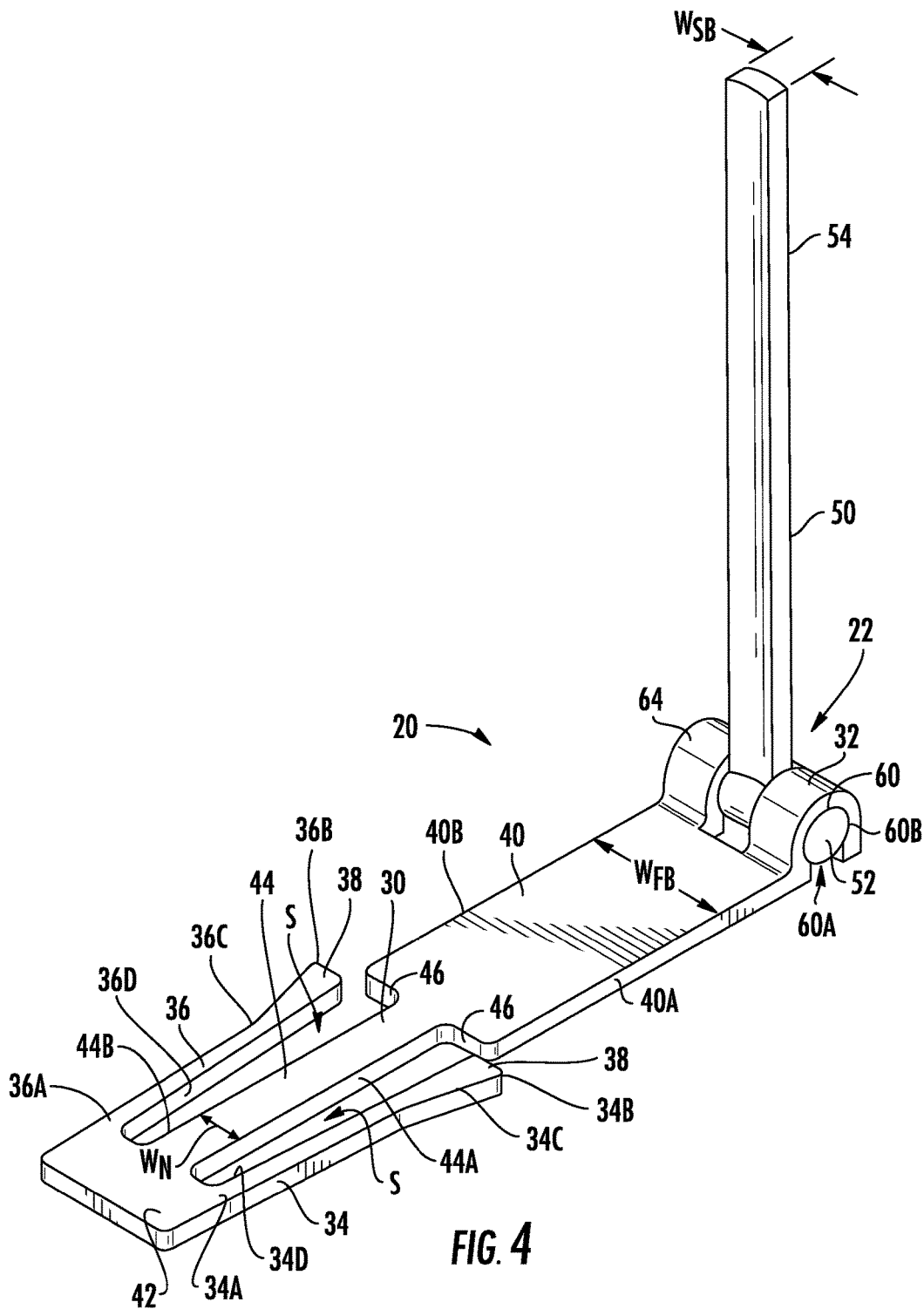
FIG. 4 illustrates a perspective view of the embodiment of the wall support according to FIG. 3 with the wall support in a supporting position.

FIGS. 3-6 illustrate an example embodiment of a wall support 20 for a liquid containment apparatus 10. The wall support 20 can comprise a first support arm 30 that can include a pivot end 32 and a first retention ear 34 and a second support arm 50 that can be pivotally secured to the pivot end 32 of the first support arm 30. The second support arm 50 can be pivoted between a first position, or collapsed position, 26, as shown in FIG. 3, where the second support arm 50 is collapsed toward the first support arm 30 to a second position, or supporting position, 22, as shown in FIG. 4, where the second support arm 50 can be at an angle to the first support arm 30. For example, the second support arm 50 can be pivotably moveable between a first position 26 substantially parallel to the first support arm 30 to a second position 22 where the second support arm 50 is at an angle greater than 0° relative to the first support arm 30. For instance, the second support arm 50 can be pivoted relative to the first support arm 30 from 0%90°, from 0°-100°, from 0°-75°, 0°-120° or from 0°-150° between the first, or collapsed, position 26 and the second, or supporting, position 22 in accordance with some embodiments. This pivoting range can be less than 180°, less than 170°, or less than 160° in some embodiments.

The first retention ear can extend outward from a top, a bottom, or a side of the first support arm 30. The first retention ear can be a stationary extension or can be a compressible extension. In some embodiments, multiple retention ears can extend from the first support arm. For example, the first support arm can comprise a pair of retention ears that can be on opposing sides or areas of the first support arm. For example, in some embodiments, one retention ear can extend from the top of the first support arm and the other retention ear can extend from the bottom of the support arm. In some embodiments, the retention ears can extend from opposing lateral sides. In some embodiments, the retention ears can be stationary. In some embodiments, one or more of the retention ears can be compressible, such as a compressible button or a cantilevered arm.

As shown in FIGS. 3 and 4, the first support arm 30 can comprise a pair of laterally compressible retention ears. For example, the first support arm 30 can comprise both a first compressible retention ear 34 and a second compressible retention ear 36 on an opposing side of the first support arm 30 from which the first retention ear 34 extends. In particular, in some embodiments, the first support arm 30 can comprise a body 40 to which the pivot end 32 can be secured and a head 42 secured to the body 40 by a neck 44 that extends between the head 42 and the body 40.

The first retention ear 34 can be cantilevered from the head 42 and can extend along a first side edge 44A of the neck 44 toward the body 40, while the second compressible retention ear 36 can be cantilevered from the head 42 so that retention ear 36 extends along a second side edge 44B of the neck 44 toward the body 40. The first retention ear 34 can comprise an exterior edge 34C and the second retention ear 36 can comprise an exterior edge 36C. By being cantilevered, each of the first and second retention ears 34, 36 can comprise a cantilevered end 34A, 36A and a free end 34B, 36B. Since the first retention ear 34 is connected to the head 42 at the cantilevered end 34A and the second retention ear 36 is connected to the head 42 at the cantilevered end 36A, the free end 34B of the first retention ear 34 and the free end 36B of the second retention ear 36 are both compressible when a sufficient force is applied to the exterior edges 34C, 36C. The closer to the free end 34B, 36B that the force is applied to the exterior edge 34C, 36C, the less force is needed to compress the first and second retention ears 34, 36.

As shown in FIGS. 3 and 4, the first retention ear 34 can have an interior edge 34D that is spaced apart from and about parallel to the respective first edge 44A of the neck 44 forming a spacing S therebetween. Similarly, the second retention ear 36 can also have an interior edge 36D that is spaced apart from and about parallel to the respective first edge 44B of the neck 44 forming a spacing S therebetween. In some embodiments, the interior edges 34D, 36D of the first and second retention ears 34, 36 can be about parallel to the respective first and second edges 44A, 44B of the neck 44. In some embodiments, the interior edges 34D, 36D of the first and second retention ears 34, 36 can extend at an angle with the respective first and second edges 44A, 44B of the neck 44. For example, in some embodiments, the interior edges 34D, 36D of the first and second retention ears 34, 36 can extend at a slight angle of between about 1° and about 10° with the respective first and second edges 44A, 44B of the neck 44.

In this manner, the first and second retention ears 34, 36 can be pushed or compressed inward toward the neck 44 by applying appropriate pressure on the exterior edges 34C, 36C at or near the free ends 34B, 36B of the respective first and second retention ears 34, 36. At the free ends 34B, 36B in some embodiments as shown in FIGS. 3 and 4, the first and second retention ears 34, 36 can extend beyond a width $W_{FB}$ of the body 40 of the first support arm 30 (see FIG. 4) in their non-compressed position. At the same time, in some embodiments, the head 42 and cantilevered end 34A, 36A of the retention ears 34, 36 can have a total width that is slightly larger, the same, or less than the width $W_B$ of the body 40. Each of the first and second retention ears 34, 36 can comprise a protrusion 38 that can extend outward from the respective first and second retention ears 34, 36. These protrusions 38 can comprise different shapes and configurations. For example, the protrusions can be block shaped, triangular shaped, rounded, or the like. Further, the protrusions can comprise knobs, extensions, barbs, curved or slanted barbs, or the like. In particular, the first and second retention ears 34, 36 can angle outward on the exterior edge 34C, 36C at the free ends 34B, 36B forming protrusions 38 that extend past outer edges 40A, 40B of the body 40.

The spacings S between each of the interior edges 34D, 36D of the first and second retention ears 34, 36 and the respective first and second edges 44A, 44B of the neck 44 can be a distance that allows the protrusions 38 to be compressed inward to a distance so that the width of the first support arm 30 across the protrusions 38 of the first and second retention ears 34, 36 is less during compression as compared to when the first and second retention ears 34, 36 are uncompressed. In some embodiments, such spacing S and/or the compression resistance of the first and second retention ears 34, 36 can be such that the protrusions 38 can be compressed inward to a distance such that the protrusions 38 do not extend past the outer edges 40A, 40B of the body 40. In some embodiments, this compressed distance of first and second retention ears 34, 36 at the protrusions 38 may still extend past the outer edges 40A, 40B of the body 40 but too a much lesser extent to allow insertion and removal from floor receptacles, described further below, into which the first support arm 30 can be inserted. To create the spacings S, for example, the neck 44 can have a lesser width $W_N$ than the width $W_{FB}$ of the body 40 so as to form indentions 46 as shown in FIG. 4 at either side of the neck 44 into which the free end 34B, 368 of the cantilevered retention ears 34, 36 are compressible inward toward the neck 44.

Referring again to FIGS. 3 and 4, the second support arm 50 of the wall support 20 can comprise a base 52 and a body 54 that can extend in a direction about perpendicular to the base 52. The body 54 can be an elongate bar shape that has a width $W_{SB}$ that is less than the width $W_{FB}$ of the body 40 of the first support arm 30. The width $W_{SB}$ is great enough so that the second support arm 50 can support a wall of a fluid containment apparatus in an upright position. The length of the body 54 of the second support arm 50 can depend on the desired height of the wall of the fluid containment apparatus and can be a distance sufficient to support the intended wall of the fluid containment apparatus. In some embodiments, the length of the second support arm 50 can be similar to the length of the first support arm 30. In some embodiments, the length of the first support arm 30 can be greater than the length of the second support arm 50. Thus, the length of the body 54 of the second support arm 50 can be less than the length of the first support arm 30.

The pivot end 32 of the first support arm 30 can comprise a groove 60. The groove 60 can be sized for receiving the base 52 of the second support arm 50. For example, in some embodiments, the groove can run a width $W_{PE}$ of the pivot end 32. The grove 60, however, can extend a distance that is less than the width $W_{PE}$ of the pivot end 32 as long as the base 52 of the second support arm 50 can fit into the groove 60. The pivot end 32 of the first support arm 30 can also comprise an opening 62 that is transverse to the groove 60. In some embodiments, the opening 62 can run about perpendicular to the groove 60. A portion of the second support arm 50 can be inserted through the opening 62 when the base 52 of the second support arm 50 is placed into the groove 60 in the pivot end 32. For example, the body 54 of the second support arm 50 can be inserted through the opening 62 in the pivot end 32 of the first support arm 30. In some embodiments, the pivot end 32 can comprise a curved wall 68 in which the groove 60 and transverse opening 62 are formed. In some embodiments, the pivot end 32 can comprise two curved walls (not shown) in which the groove 60 that are separated by the transverse opening 62 in the pivot end 32. In some embodiments, the groove 60 can comprise an insertion aperture 60A formed by lips 66 through which the base 52 of the second support arm 50 is inserted. The groove 60 can also have a holding section 60B that is formed in the wall 64 and that serves as the location where the base 52 of the second support arm 50 after passing through the insertion aperture 60A.

The opening 62 in the pivot end 32 that is transverse to the groove 60 can allow movement of the second support arm 50 between the first position 26 and the second position 22. In general, the opening 62 in the pivot end 32 of the first support arm 30 that is transverse to the groove 60 can permit a range of motion of the body 54 of the second support arm 50 relative to the first support arm 30 to allow the body 54 of the second support arm 50 to be positioned at an angle relative to the first support arm 30. As the base 52 of the second support arm 50 rotates within the groove 60 of the pivot end 32 of the first support arm 30, the body 54 of the second support arm 50 can be moved within the opening 62 in the pivot end 32 to a desired angle relative to the first support arm 30 of which the opening 62 allows. For example, in some embodiments, the opening 62 in the pivot end 32 that is transverse to the groove 60 can allow movement of the body 54 of the second support arm 50 relative to the first support arm 30 between about 0° and about 90°. In some embodiments, the opening 62 in the pivot end 32 that is transverse to the groove 60 can allow movement of the body 54 of the second support arm 50 relative to the first support arm 30 between about 0° and about 180°. The ends of the opening 62 can act as an abutment to stop, and in some embodiments hold, the body 54 of the second support arm 50 in the desired positions relative to the first support arm 30.

As set forth above, the fluid containment apparatus 10 can comprise a floor 12 having an outer perimeter 18 and a side wall 14 that can extend upward from the outer perimeter 18 of the floor 12 to at least partially define a containment area 16 for fluid as shown in FIGS. 1 and 2. The side wall 14 can be supported by wall supports such as the wall supports 20 illustrated in FIGS. 3-6.

To facilitate the use of the wall supports 20, the fluid containment apparatus 10 can also comprise one or more floor receptacles 15 that are disposed on the outer surface, such as a bottom surface 12B, of the floor 12. The first support arms 30 of the wall support 20 can be inserted into corresponding floor receptacles 15 with the first retention ears 34 (and/or the second retention ears 36) of the first support arms 30 of the wall supports 20 holding the first support arms 30 of the wall supports 20 within the respective floor receptacles 15. The floor receptacles can comprise a variety of structures or combination of structures, including but not limited to one or more clips for receiving the retention ears of the first support arm, wide or narrow straps, pockets, one or more loops secured to the outer surface of the floor for receiving a portion of the support arm and/or the retention ears of the first support arm, or the like. In the embodiments shown in the figures, the floor receptacles can comprise floor pockets 15. Floor pockets 15 can be connected to a bottom surface 12B of the floor 12 on at least two opposing sides 15A, 15B of each floor pocket 15 as shown in the inverted embodiments in FIGS. 5 and 6.

Figure 9:
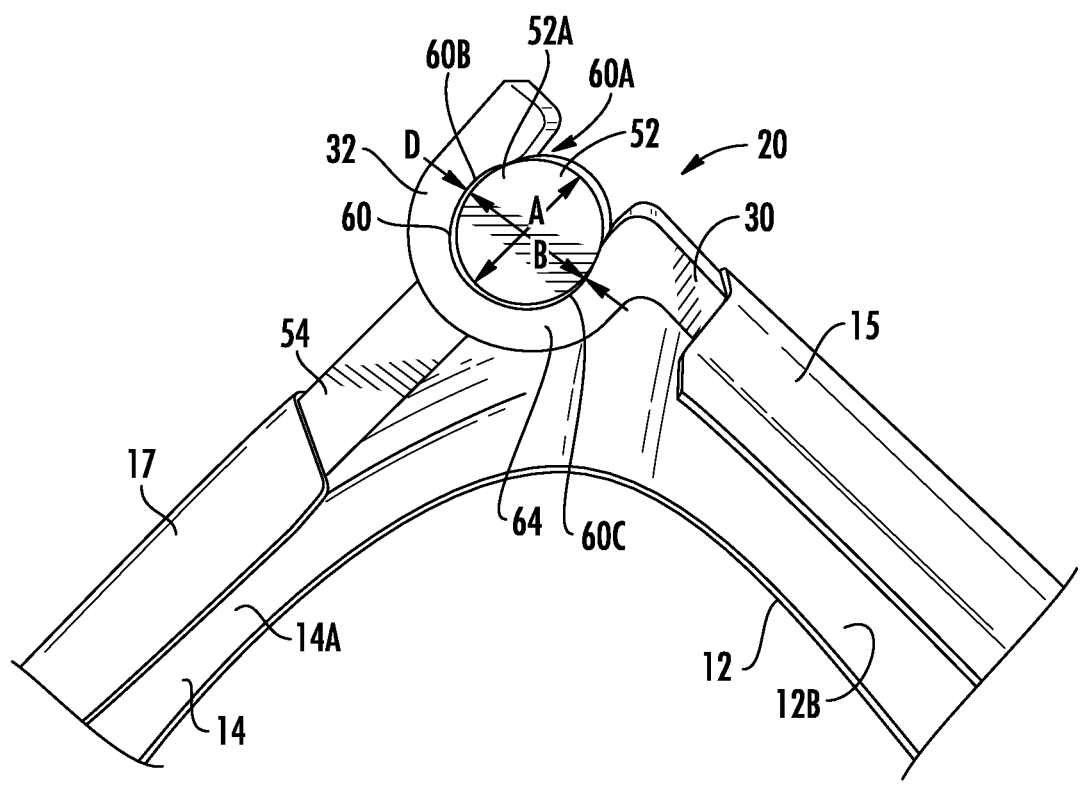
FIG. 9 illustrates a perspective view of an inverted portion of a further embodiment of a fluid containment apparatus including a wall support in accordance with the subject matter disclosed herein.

As shown in FIGS. 1, 2 and 9, the fluid containment apparatus 10 can also comprise one or more side wall receptacles 17 disposed on an outer surface 14A of the side wall 14. Second support arms 50 of the wall supports 20 can be inserted into the side wall receptacles 117. Each side receptacle 17 can be aligned with a corresponding floor receptacle 15. As with the floor receptacles, the side wall receptacles can comprise a variety of structures or combination of structures, including but not limited to one or more clips for receiving the second support arm, wide or narrow straps, pockets, one or more loops secured to the outer surface of the side wall for receiving a portion of the second support arm, or the like. In the embodiments shown in the figures, the side wall receptacles can comprise side wall pockets 17. The side wall pockets 17 can be connected to the outer surface 14A of the side wall 14 with the side wall pockets 17 being aligned with and corresponding to the one or more floor pockets 15. The number of floor pockets 15 and side pockets 17 can correspond to the number of wall supports 20 that are intended to be used. In some embodiments, extra floor pockets 15 and side pockets 17 can be provided in case more wall supports 20 are needed for extra support. For each wall support 20 used, the second support arm 50 of each wall support 20 can be inserted into a corresponding side wall pocket 17 and the first, support arm 30 of each wall support 20 can be inserted into a corresponding floor pocket 15 with at least a first retention ear 34 of each first support arm 30 of the wall support 20 holding the respective first support arm 30 of the wall support 20 within the floor pocket 15.

Figure 5:
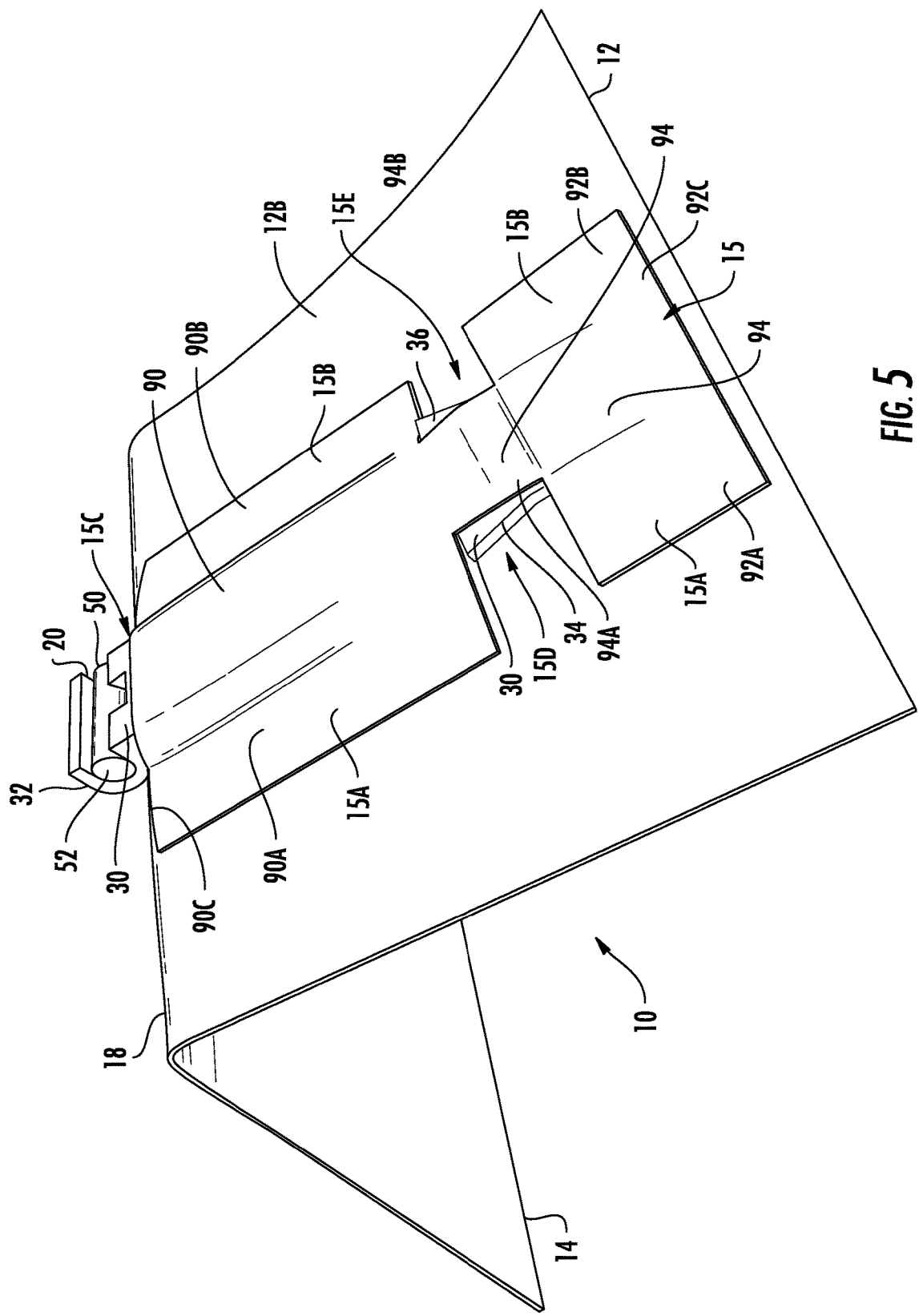
FIG. 5 illustrates a perspective view of an inverted portion of an embodiment of a fluid containment apparatus including a wall support in accordance with the subject matter disclosed herein.

As shown in FIG. 5, the fluid containment apparatus has been inverted to illustrate the structure and the operation of a floor pocket 15. The floor pocket 15 can have an opening 15C that faces the outer perimeter 18 of the floor 12 as well as openings 15D, 15E in the two opposing sides 15A, 15B of the floor pocket 15 in some embodiments. The shape of the head 42 of the first support arm 30 and the slant of the exterior edges on the retention ears 34, 36 of the first support arm 30 as well as the distance between the opposing sides 15A, 15B of the floor pocket 15 that are connected to the outer surface 12B of the floor 12 allow the retention ears to be compressed upon initial insertion into the opening 15C that faces the outer perimeter 18 of the floor 12. Once the free ends of the retention ears 34, 36 enter the side openings 15D, 15E in the two opposing sides 15A, 15B, the size of the side openings 15D, 15E allow the retention ears 34, 36 become uncompressed. The uncompressed retention ears 34, 36 extend through the opposing side openings 15D, 15E after insertion of the first support arm 30 into the floor pocket 15 through the opening 15C facing the outer perimeter 18 of the floor 12 as shown in FIG. 5.

For example, as shown in FIG. 5, in some embodiments, the floor pocket 15 can comprise a foot end 90 that can comprise a front edge 90C and two opposing sides 90A, 90B. The foot end 90 can be positioned adjacent the outer perimeter 18 of the floor 12 with the two opposing sides 90A, 90B of the foot end 90 being secured to the bottom surface 12B of the floor 12 and the front edge 90C forming the opening 15C that faces the outer perimeter 18 of the floor 12. The floor pocket 15 can further comprise a head end 92 that can include a back edge 92C and two opposing sides 92A, 92B. The back edge 92C and the two opposing sides 92A, 92B of the head end 92 can also be secured to the bottom surface 12B of the floor 12. Additionally, the floor pocket 15 can comprise a neck 94 having two opposing sides 94A, 94B and connecting the foot end 90 and the head end 92 of the floor pocket 15. The two opposing side 94A, 94B of the neck 94 are not secured to the bottom surface 12B of the floor 12 so as to form the openings 15D, 15E in the two opposing sides 15A, 15B of the floor pocket 15.

Figure 6:
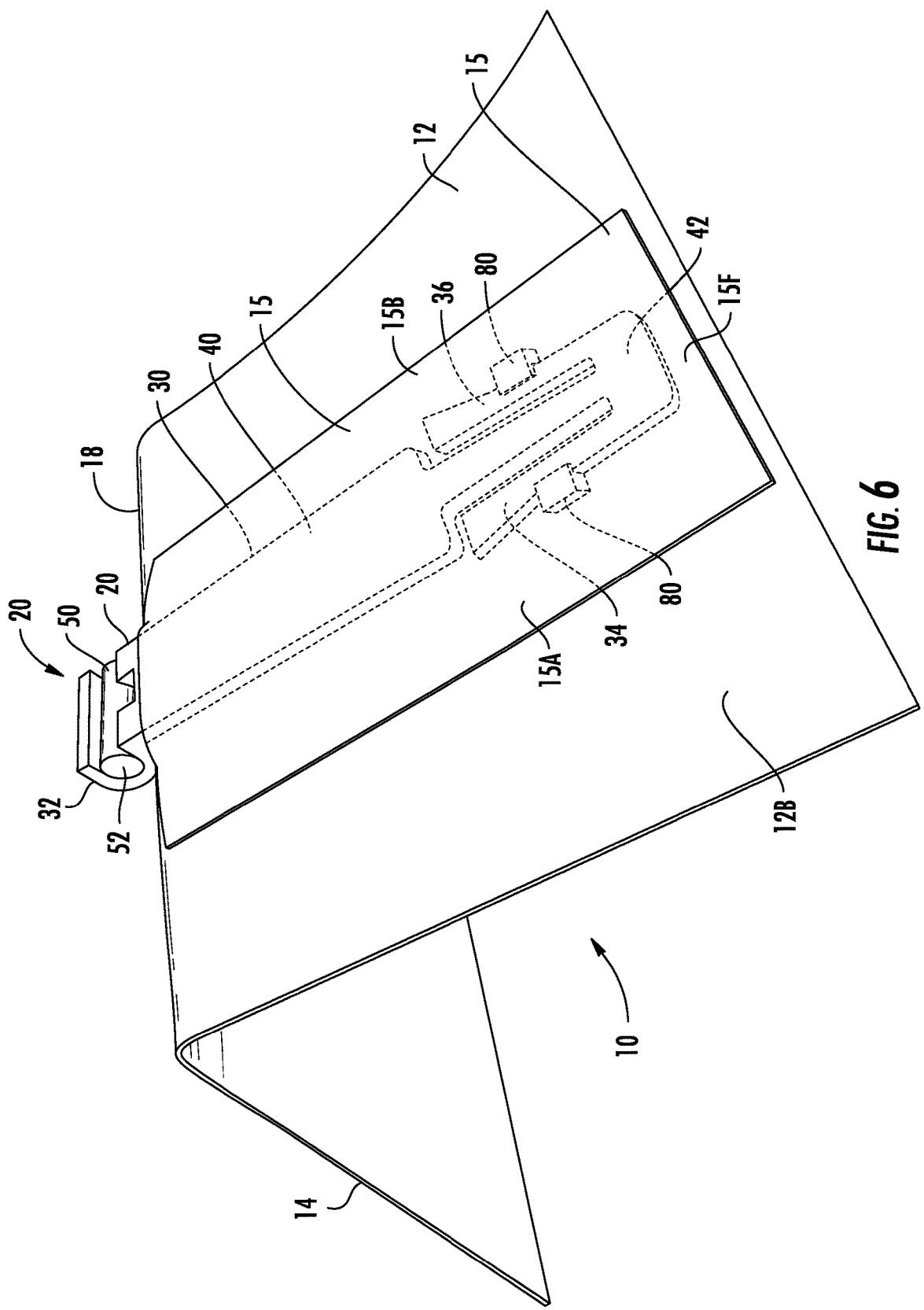
FIG. 6 illustrates a perspective view of an inverted portion of another embodiment of a fluid containment apparatus including a wall support in accordance with the subject matter disclosed herein.

FIG. 6 also shows a portion of the fluid containment apparatus 10 in an inverted position to illustrate another embodiment of a different mechanism for securing the first support arm 30 to the floor 12 of the fluid containment apparatus 10. As shown in FIG. 6, in some embodiments, opposing clips 80 can be secured to the bottom surface 12B of the floor 12 into which the first and second retention ears 34, 36 can be inserted. For example, the opposing clips 80 can be aligned with each other at a distance from each other such that, as the retention ears 34, 36 are inserted between the clips 80, retention ears 34, 36 are compressed to create a frictional holding force to secure the first support arm 30 to the floor 12. In some embodiments, the opposing clips can reside within a floor pocket 15 as shown in FIG. 6. In some embodiments, the opposing clips can operate alone to hold the first support arm 30 without a floor pocket 15 (not shown). The floor pocket 15 in this embodiment can have an opening 15C facing the outer perimeter 18 of the floor 12 into which the first support arm 30 can be inserted to engage the opposing clips 80 therein. The floor pocket 15 can have opposing sides 15A, 15B that are secured to the bottom surface 12B of the floor 12 along the entire length of the opposing sides 15A, 15B. Additionally, the floor pocket 15 can have a head end 15F that can also be secured to the bottom surface 12B of the floor 12.

Figure 7:
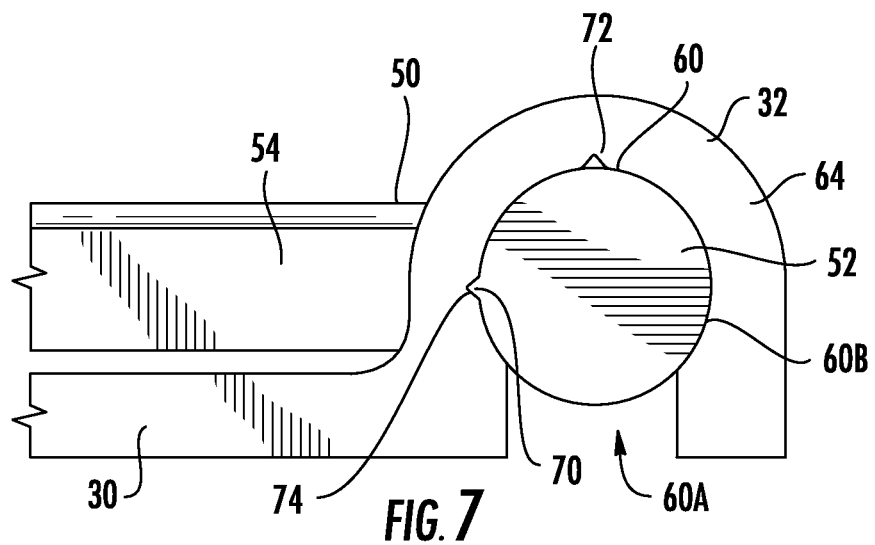
FIG. 7 illustrates a partial side view of an embodiment of a wall support in accordance with the subject matter disclosed herein with the wall support in a collapsed position.
Figure 8:
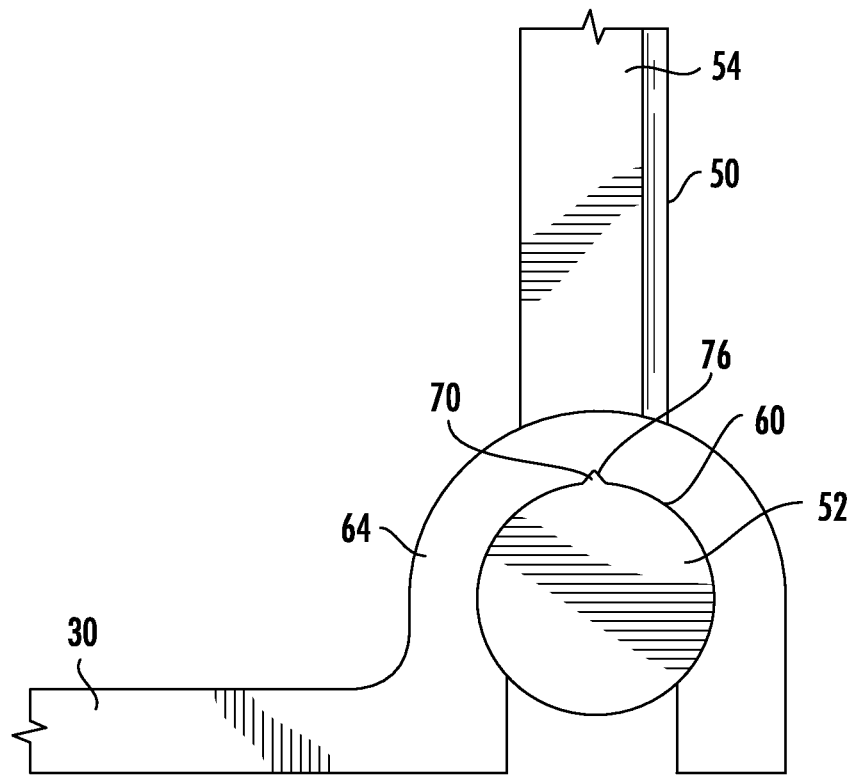
FIG. 8 illustrates a partial side view of another embodiment of a wall support in accordance with the subject matter disclosed herein with the wall support in a supporting position.

Referring back to the wall supports 20, once the second support arm 50 is pivoted to a desired angle relative to the first support arm 30, the second support arm 50 can be held in the desired angle in a variety of ways. In some embodiments, the second support arm 50 can be held in the supporting, or second, position 22 through the use of a detent 70 and one or more corresponding indentions 72, 74 as shown in FIGS. 7 and 8. For example, in some embodiments as shown in FIG. 8, the base 52 of the second support arm 50 can comprise a detent 70 and the wall 64 of the pivot end 32 can form an indention 72 in the groove 60 for receiving the detent 70 when the second support arm 50 is moved into one of the first position 26 or the second position 22. When the body 54 of the second support arm 50 is raised to the supporting, or second, position 22, the detent 70 enters the indention 72 to lock the second support arm 50 in the second position 22. In order to lower the second support arm 50, sufficient force can be applied to the second support arm 50 to force the detent 70 out of the indention 72 so that the second support arm 50 can be moved to the collapsed, or first, position 26. The detent 70 can frictionally engage the wall 64 of the pivot end 32 that forms the groove 60 once the detent 70 is out of the indention 72.

In some embodiments, as shown in FIG. 7, the base 52 of the second support, arm 50 can comprise a detent 70 and the wall 64 of the pivot end 32 can form in the groove 60 a first indention 74 for receiving the detent 70 when the second support arm 50 is in the collapsed, or first, position 26 and a second indention 72 for receiving the detent 70 when the second support arm 50 is in the second position 22. The detent 70 can extend, or protrude, outward from the base 52. As with the embodiment shown in FIG. 8, when the body 54 of the second support arm 50 shown in FIG. 7 is raised to the supporting, or second, position 22, the detent 70 enters the indention 72 to lock the second support arm 50 in the second position 22. In order to lower the second support arm 50, sufficient force can be applied to the second support arm 50 to force the detent 70 out of the indention 72 so that the second support arm 50 can be moved to the collapsed, or first, position 26 where the detent 70 can enter the indention 74 to lock the second support arm 50 in the collapsed, or first, position 26 as shown in FIG. 7. Similarly, to raise the second support arm 50, sufficient force can be applied to the second support arm 50 to force the detent 70 out of the indention 74 so that the second support arm 50 can be moved to the supporting, or second, position 22 where the detent 70 can enter the indention 72 to lock the second support arm 50 in the second position 22. The detent 70 can frictionally engage the wall 64 of the pivot end 32 that forms the groove 60 once the detent 70 is out of the indentions 72 and 74.

In some embodiments, the detent 70 can extend in a plane about parallel to the plane in which the body 54 of the second support arm 50 extends. As shown in FIGS. 7 and 8, in some embodiments, the detent 70 can protrude outward from the base 52 of the second support arm 50 in parallel with the body 54 of the second support arm 50 so that the detent 70 is always extending in the same direction as the body 54 of the second support arm 50. In some embodiments, the detent 70 can extend, or protrude at an angle relative to the direction the body 54 of the second support arm 50 extends. While only one detent is shown in FIGS. 7 and 8, it is understood that the multiple detents can be aligned on the base 52 of the second support arm 50 with each detent having at least one corresponding indention. For example, a detent can extend outward from the base 52 on either side of the body 54.

FIG. 9 shows a portion of the fluid containment apparatus 10 and an embodiment of a wall support 20 in an inverted position and illustrates another manner in which the second support arm 50 can be held in the desired angle. In some embodiments, as shown in FIG. 9, the base 52 can comprise a non-circular cross-section 52A and a portion of the groove 60 in which the base 52 resides can have at least a portion of a circular cross-section 60A, such that a holding force is created between the pivot end 32 and the second support arm 50 when the second support arm 50 is moved between the first position 26 and the second position 22 (see FIGS. 1-4). For example, in some embodiments, the base 52 of the second support arm 50 can comprise an oblong cross-section 52A and a portion of the groove 60 in which the base 52 of the second support arm 50 resides can have at least a portion of a circular cross-section 60C, such that a holding force is created between the pivot end 32 and the second support arm 50 when the second support arm 50 is in the supporting, or second, position 22, in the collapsed, or first, position 26, or is moved between the first position 26 and the second position 22. In the embodiment shown in FIG. 9, a frictional holding force can be provided by the frictional engagement of the oblong cross-section 52A against the holding section 60B of the groove 60 when the second support arm 50 is in the collapsed, or first, position 26, or is moved between the first position 26 and the second position 22. In particular, the longer portion of the oblong cross-section 52A frictionally engages the wall 64 that forms the groove 60 in which the base 52 of the second support arm 50 resides. Meanwhile, a resistance holding force can be provided when the second support arm 50 is in the supporting, or second, position 22 as explained further below.

For example, the cross-section 52A of the base 52 can be close to a circular cross-section as shown in FIG. 9 but can have a slightly longer length A in a direction that runs about parallel with the length of the body 54 of the second support arm 50 than a width B that runs in a direction about perpendicular with the length of the body 54 of the second support arm 50. For instance, in some embodiments, the cross-section 52A of base 52 can be generally an oval shape or an elliptical shape. In some embodiments, the cross-section 52A of the base 52 can have a width B that runs in a direction about perpendicular with the length of the body 54 of the second support arm 50 that is similar in length to a diameter D of the circular cross-section portion 60C of the groove 60 formed in the pivot end 32. In this manner, when the second support arm 50 is in a collapsed, or first, position 26 (see FIGS. 2 and 3), the length A of the cross-section 52A of the base 52, which can be slightly longer than the diameter D of the circular cross-section 60A of the groove 60, frictionally engages the wall 64 of the pivot end 32 that form the groove 60 and, in some embodiments, cause a slight deformation in the wall 64 of the pivot end 32.

When the second support arm 50 is in the supporting, or second, position 22, as shown in FIG. 9, at approximately 90° to the first support arm 30, then the length A of the cross-section 52A of the base 52 can align with the insertion aperture 60A of the groove 60 so that the length A can at least partially extend out of the circular cross-section portion 60C of the holding section 60B of the groove 60 and into the insertion aperture 60A. In this manner, the frictional engagement caused by the length A against the circular cross-section portion 60C of the groove 60 is removed, or at least lessened.

In such embodiments, to move the second support arm 50 from the supporting, or second, position 22 to the collapsed, or first position 26, a sufficient force must be applied to overcome the resistance of the length A of the cross-section 52A of the base 52 to fully enter the circular cross-section portion 60C of the groove 60. Without such sufficient force being applied, the second support arm 50 can be considered effectively locked in the supporting, or second, position 22. The inner lips 66 of the pivot end 32 at the insertion aperture 60A of the groove 60 can be rounded to facilitate the movement of the oblong cross-section 52A of the base 52. In such embodiments, this resistance to re-entry of the length A of the oblong cross-section 52A of the base 52 into the circular cross-section portion 60C of the groove 60 can hold the second support arm 50 in the supporting, or second, position 22. At the same time, the frictional engagement of the length A of the cross-section 52A of the base 52 within the circular cross-section portion 60C of the groove 60 can hold the second support arm 50 in the collapsed, or first, position 26.

Figure 10:
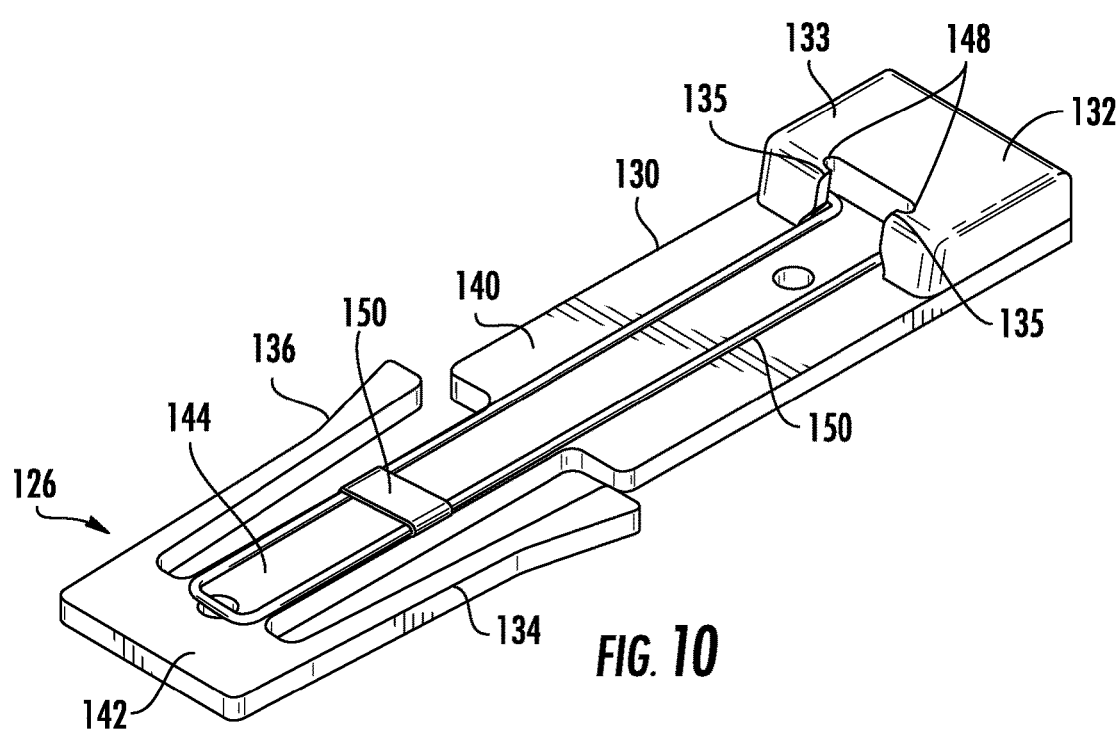
FIG. 10 illustrates a perspective view of an alternative embodiment of a wall support in accordance with the subject matter disclosed herein with the wall support in a collapsed position.
Figure 11:
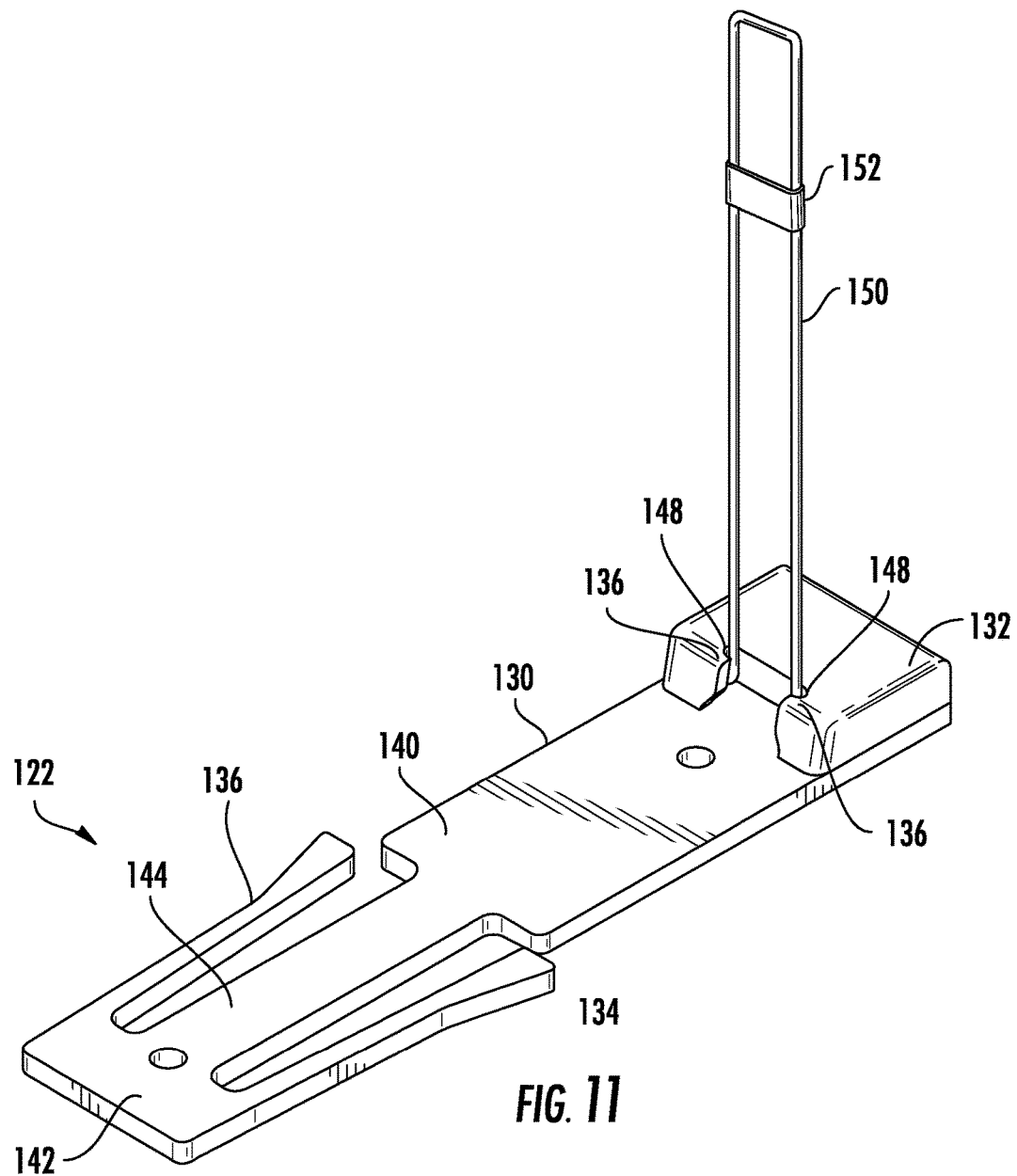
FIG. 11 illustrates a perspective view of the embodiment of the wall support according to FIG. 10 with the wall support in a supporting position.

Referring to FIGS. 10-14, a different embodiment of a wall support 120 is provided. The wall support 120 can comprise a first support arm 130 can comprise a pivot end 132 and a first laterally compressible retention ear 134 and a second laterally compressible retention ear 136. The retention ears 134, 136 can comprise a structure and operate in manner similar to those described above. The wall support 120 can comprise a second support arm 150 that can be pivotally secured to the pivot end 132 of the first support arm 120. The second support arm 150 can be pivotably moveable between a collapsed, or first, position 126 proximate to the first support arm 130 as shown in FIG. 10 and a supporting, or second, position 122 where the second support arm 150 is at an angle greater than 0° relative to the first support arm 130 as shown in FIG. 11. In particular, the pivot end 132 can comprise a base member 133 that is secured to a body 140 of the first support arm 130 and the second support arm 150 can be hinged to the base member 133 of the pivot end 132 so that the second support arm 150 can pivot with respect to the base, member 133. The base member 133 and the first support arm 130 can remain in the same location when the second support arm 150 is in both the first position 126 and in the second position 122. The base member 133 can operate in a manner similar to those described in U.S. patent application Ser. No. 13/017,685, filed Jan. 31, 2011, and U.S. patent application Ser. No. 13/605,355, filed Sep. 6, 2012, both of which are incorporated herein by reference in their entireties.

Figure 12:
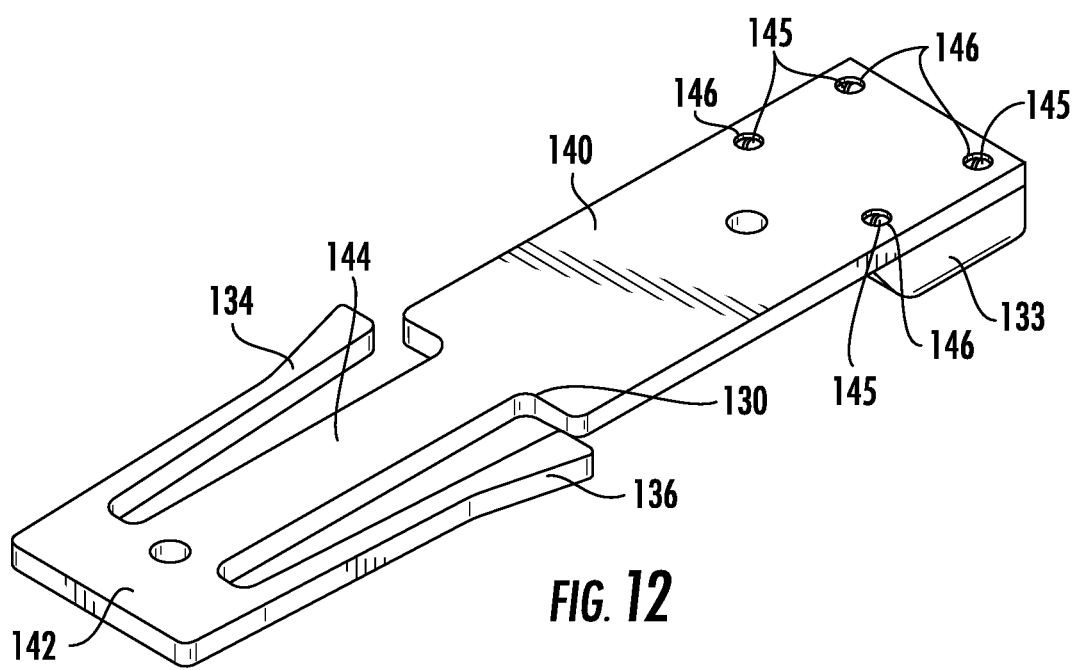
FIG. 12 illustrates a perspective bottom view of the embodiment of the wall support according to FIG. 10.

In some embodiments as shown, the first support arm 130 can comprise the body 140 to which the base member 133 of the pivot end 132 can be secured and a head 142 secured to the body 140 by a neck 144 that extends between the head 142 and the body 140. As above, the retention ears 134, 136 can extend from the head 142. The base member 133 can be secured to the body 140 of the first support arm 130 in different manners. In some embodiments, as shown in FIG. 12, the base member 133 can be a separate structure that can be secured to the body 140 of the first support arm 130. For example, fasteners can be used to secure the base member 133 to the body 140 of first support arm 130. In the embodiment shown, screw holes 146 are provide in the body 140 through which screws 145 can be screwed in the base member 133 to secure the base member 133 to the body 104 of the first support arm 130.

The base member 133 can define one or more detents 135 that can hold the second support arm 150 when the second support arm 150 is in the second position 122. When a sufficient amount of force is applied to the second support arm 150, the second support arm 150 is forced out of one or more detents 135 so as to pivot with respect to the base member 133 towards the first support arm 130. When the second support arm 150 is in the first position 126 and is subsequently moved back to the second position 122, sufficient force is applied to the second support arm 150 causing the second support arm 150 to be forced back into one or more receiving grooves 148 formed by the one or more detents 135 to be held therein.

In some embodiments, as shown in FIGS. 10-14, the base member 133 can comprise a plastic material that is generally rigid while allowing for some amount of flexibility. The base member 133 can comprise polyethylene or polyurethane in accordance with certain exemplary embodiments. However, it is to be understood that the second support arm 150 can be made out of various materials. In the embodiment shown, the second support arm 150 can comprise a metal such as aluminum or steel and can have a circular cross-section and a generally u-shape such that a central aperture is defined by the second support arm 150 and the base member 133. However, the second support arm 150 may be variously configured in accordance with other exemplary embodiments of the fluid containment apparatus 110. The second support arm 150 can comprise a metal such as steel or aluminum, or may be made of plastic in certain exemplary embodiments.

The second support arm 150 can pivotally engage the base member 133 that comprises the pivot end 132 of first support arm 130 such that the pivoting second support arm 150 can move with respect to the first support arm 130. A reinforcing cross-brace 152 can extend between the u-shaped portion of the second support arm 150 in order to strengthen the second support arm 150 at a desired location to ensure the desired amount of bending and bending location of the second support arm 150 is achieved. Although a single reinforcing cross-brace 152 is shown in FIG. 9, any number or none at all may be used in various exemplary embodiments.

The grooves 148 formed by the base member 133 and detents 135 can be curved such that curved outer surfaces of the second support arm 150 can be received therein. It is to be understood that the second support arm 150 can be variously arranged with respect to the base member 133 so as to be allowed to pivot with respect to the base member 133 and that the disclosed arrangement is only one possible option.

When in the supporting, or second, position 22, the second support arm 150 is retained by the detents 135 of the base member 133. The detents 135 function to hold the second support arm 150 in the initial supporting position 22 illustrated in FIGS. 11, 13, and 14.

Once it is desired to move the wall support 20 to the collapsed, or first, position 26, the detents 135 and the second support arm 150 are arranged to accommodate such repositioning. Application of a sufficient amount of force to the second support arm 150, for example upon being acted upon by the weight of a vehicle 82 (shown in FIG. 2), can cause the second support arm 150 to be snapped out of the detents 135 and subsequently allowed to pivot with respect to the base member 133. In this arrangement, the base member 133 can be made of a material that has some degree of inherent flexibility to allow the detents 135 to flex an amount to permit the second support arm 150 to pass out of the grooves 148. The shape of the second support arm 150 in the embodiment shown can permit the second support arm 150 to flex. Thus, in some embodiments, the second support arm 150 may be removed from the grooves 148 via a combination of both flexing of the detents 135 and flexing of the second support arm 150. Once removed from the grooves 148, the second support arm 150 is free to be pivoted with respect to the base member 133 and the first support arm 130. In order to return the second support arm 150 to the supporting, or second, position 22, a return force can be applied that is sufficient to reinsert the second support arm 150 back into the grooves 48. The same mechanisms, flexing of the detents 135 in addition to or alternatively to flexing of the second support arm 150, may be employed to return the second support arm 150 to the grooves 148. Other mechanisms or arrangements between the second support arm 150 and the base member 133 can be employed to maintain the orientation between these components and to also allow these components to move with respect to one another.

Figure 13:
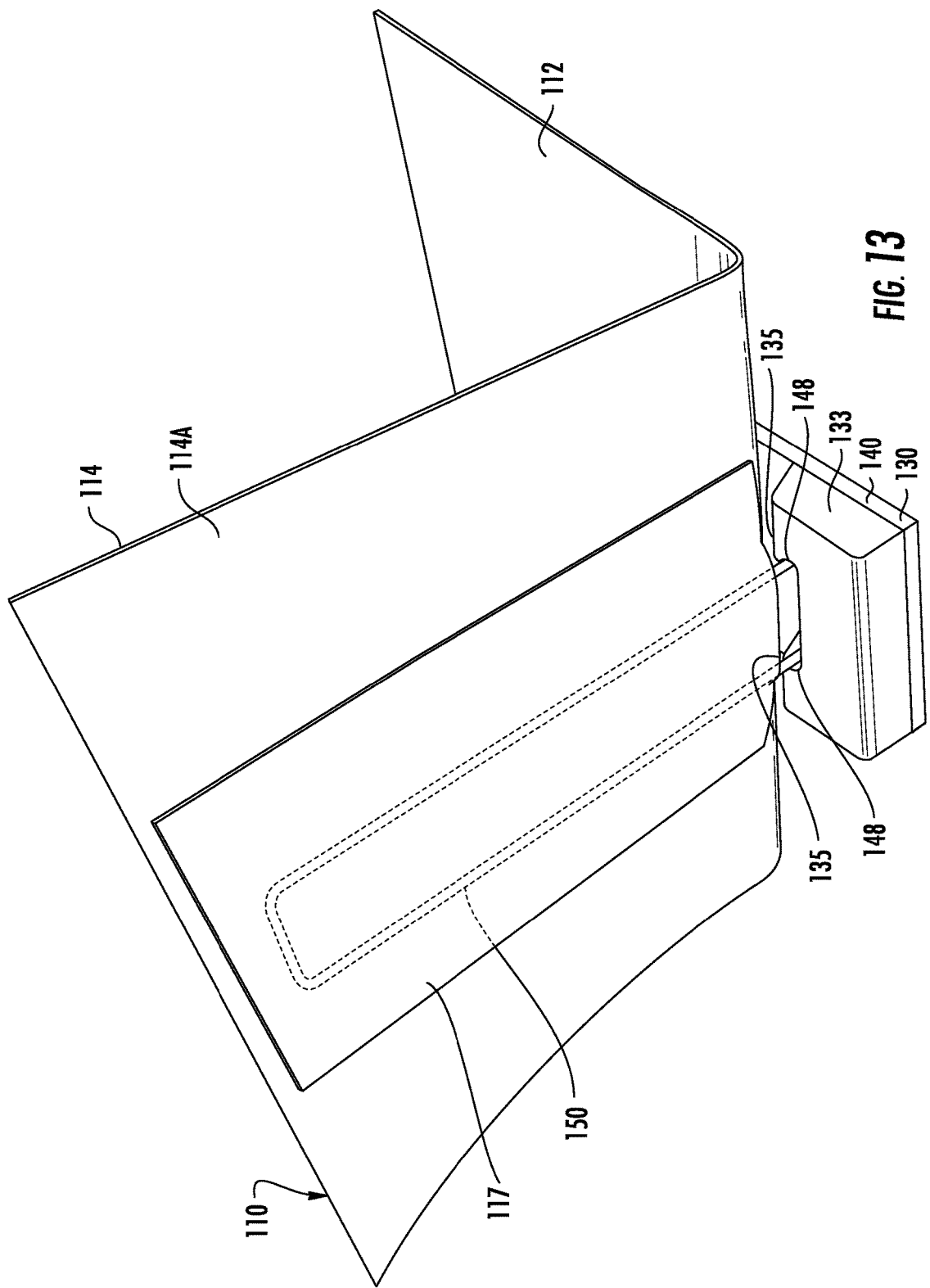
FIG. 13 illustrates a perspective view of a portion of a further embodiment of a fluid containment apparatus including a wall support in accordance with the subject matter disclosed herein.
Figure 14:
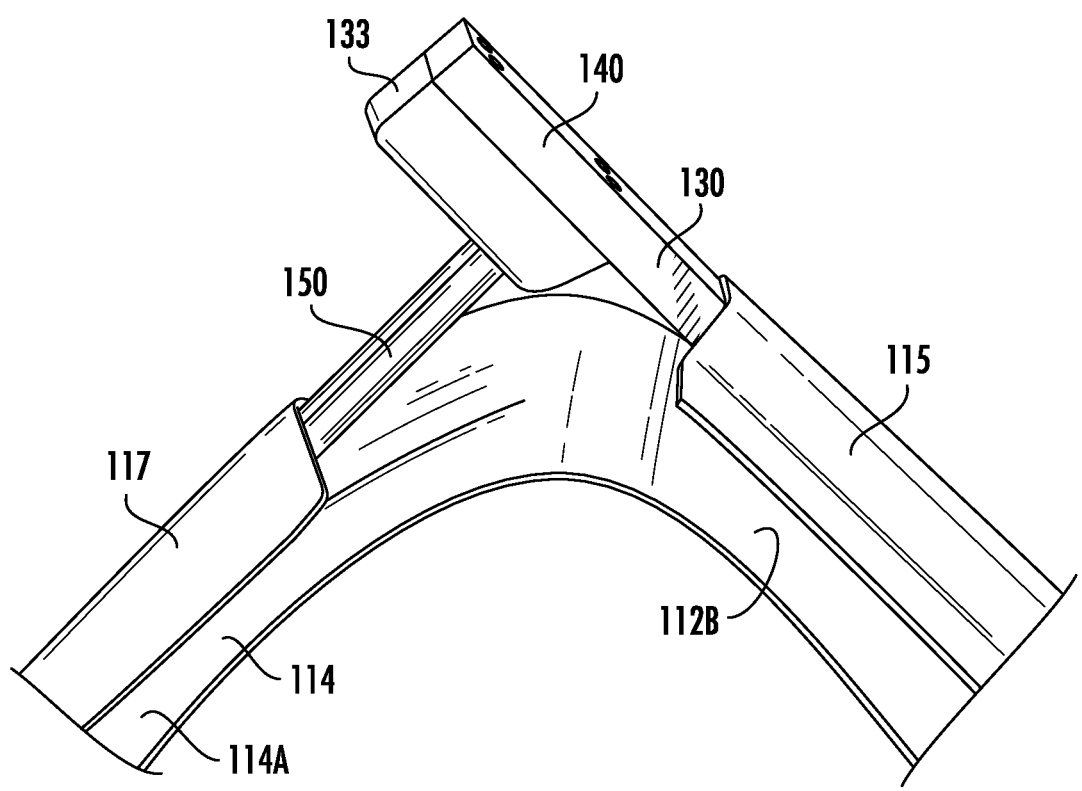
FIG. 14 illustrates a perspective view of an inverted portion of the embodiment of the fluid containment apparatus according to FIG. 13.

To facilitate the use of the wall supports 120, a fluid containment apparatus 110, a portion of which being as shown in FIGS. 13 and 14, can also comprise one or more floor receptacles 115 that are disposed on the outer surface, such as a bottom surface 112B, of the floor 112 and one or more side wall receptacles 117 disposed on an outer surface 114A of the side wall 114. Second support arms 150 of the wall supports 120 can be inserted into the side wall receptacles 117. The first support arms 130 of the wall support 120 can be inserted into corresponding floor receptacles 115 with the first retention ears 134 (and/or the second retention ears 136) of the first support arms 130 of the wall supports 120 holding the first support arms 130 of the wall supports 120 within the respective floor receptacles 115. The floor receptacles can comprise a variety of structures or combination of structures, including but not limited to one or more clips for receiving the retention ears of the first support arm, wide or narrow straps, pockets, one or more loops secured to the outer surface of the floor for receiving a portion of the support arm and/or the retention ears of the first support, arm, or the like. In the embodiments shown in the figures, the floor receptacles can comprise floor pockets 115. The one or more floor pockets 115 that can be connected to a bottom surface 112B of a floor 112 of the fluid containment apparatus 110 as shown in FIG. 14, which shows a portion of a fluid containment apparatus 110 shown in FIG. 13 inverted.

As shown in FIGS. 13 and 14, each side receptacle 117 can be aligned with a corresponding floor receptacle 115. As with the floor receptacles, the side wall receptacles can comprise a variety of structures or combination of structures, including but not limited to one or more clips for receiving the second support arm, wide or narrow straps, pockets, one or more loops secured to the outer surface of the side wall for receiving a portion of the second support arm, or the like. In the embodiments shown in the figures, the side wall receptacles can comprise side wall pockets 117. As shown in FIG. 13, the one or more wall pockets 117 can be connected to the outer surface 114A of the side wall 114 with the side wall pockets 117 being aligned with and corresponding to the one or more floor pockets 115. The number of floor pockets 115 and side pockets 117 can correspond to the number of wall supports 120 that are intended to be used. In some embodiments, extra floor pockets 115 and side pockets 117 can be provided in case more wall supports 120 are needed for extra support. The floor pockets 115 and the side pockets 117 can have a similar construction as the floor and side pockets described above.

For each wall support 120 used, the second support arm 150 of each wall support 120 can be inserted into a corresponding side wall pocket 117 and the first support arm 130 of each wall support 120 can be inserted into a corresponding floor pocket 115 with at least a first retention ear 134 of each first support arm 130 of the wall support 120 holding the respective first support arm 130 of the wall support 120 within the floor pocket 115. In this manner a fluid containment apparatus 110 can have an upstanding side wall 114 through the support of the wall supports 120.

Figure 15:
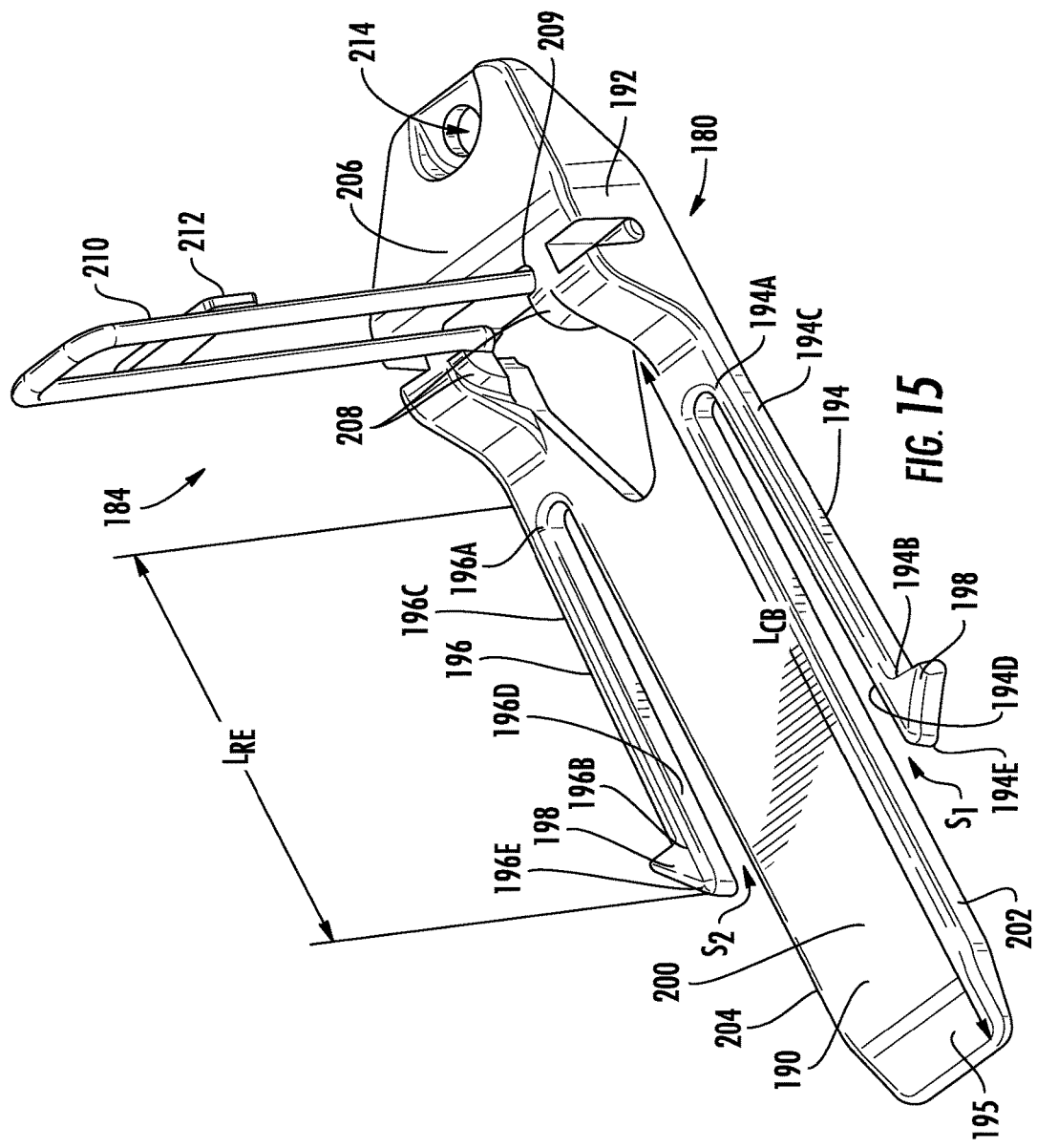
FIG. 15 illustrates a perspective view of an embodiment of a wall support in accordance with the subject matter disclosed herein with the wall support in a supporting position.

Referring to FIGS. 15-17B, a different embodiment of a wall support 180 is provided. The wall support 180 can comprise a first support arm 190 that can comprise a pivot end 192 and a first laterally compressible retention ear 194 and a second laterally compressible retention ear 196. The retention ears 194, 196 can comprise a structure and operate in manner as described in more detail below. The wall support 180 can comprise a second support arm 210 can be pivotally secured to the pivot end 192 of the first support arm 180. The second support arm 210 can be pivotably moveable between a collapsed, or first, position 182 proximate to the first support arm 190 as shown in FIGS. 16B and 17A and a supporting, or second, position 184 where the second support arm 210 is at an angle greater than 0° relative to the first support arm 190 as shown in FIGS. 15 and 16A. In particular, the pivot end 192 can comprise a base member 206 that is secured to, or is an integral part of, the first support arm 190. The second support arm 210 can be hinged to the base member 206 of the pivot end 192 so that the second support arm 210 can pivot with respect to the base member 206. The base member 206 and the first support arm 190 can remain in the same location when the second support arm 210 is in both the first position 182 and in the second position 184. The base member 206 can operate in a manner similar to those described in U.S. patent application Ser. No. 13/017,685, filed Jan. 31, 2011, and U.S. patent application Ser. No. 13/605,355, filed Sep. 6, 2012 as mentioned above.

Figure 17A:
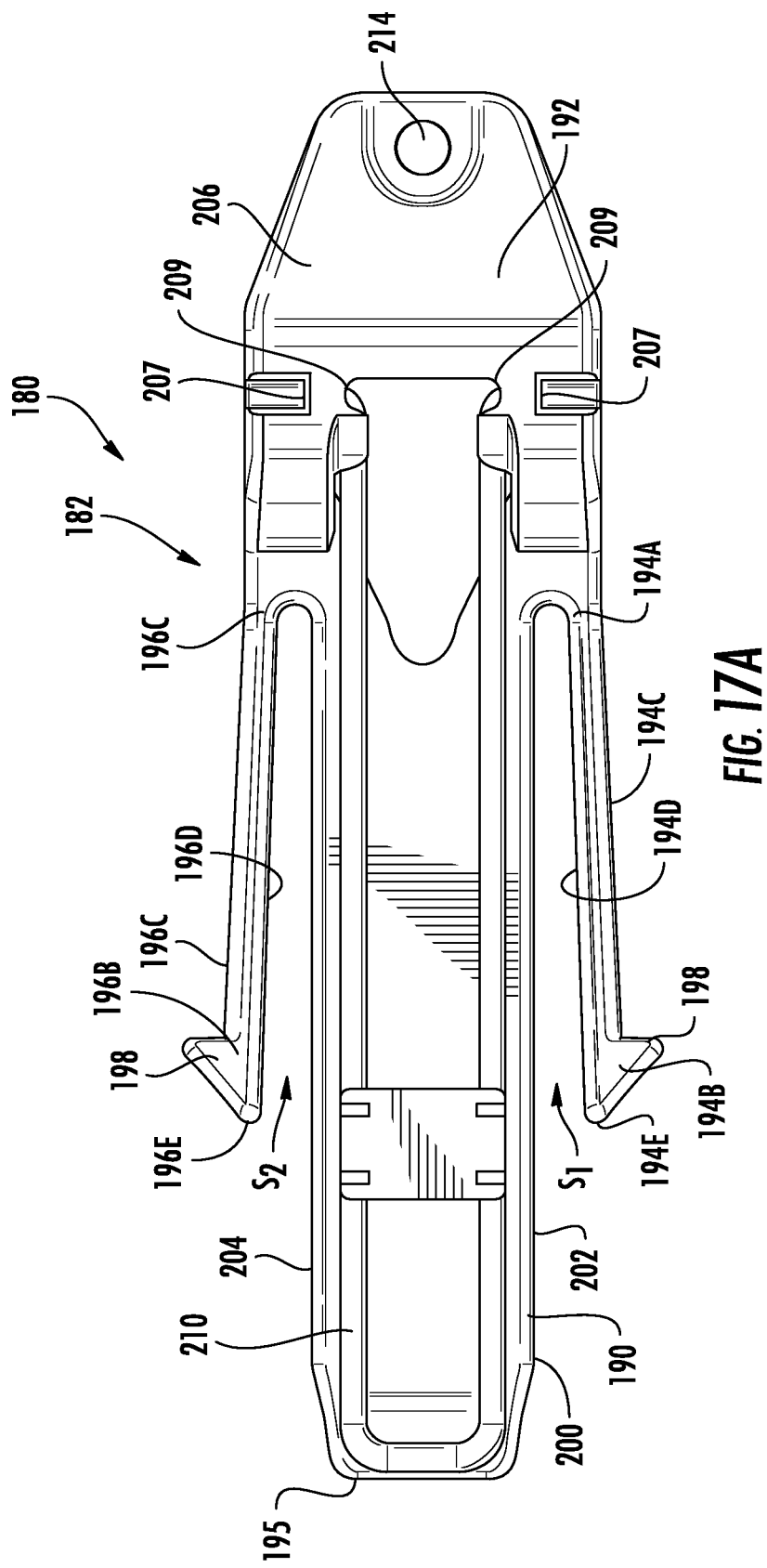
FIG. 17A illustrates a top plan view of the embodiment of the wall support according to FIG. 15 with the wall support in a collapsed position.

As shown in FIGS. 15 and 17A, the first support arm 190 can have the first compressible retention ear 194 on an opposing side of the first support arm 190 from the second compressible retention ear 196. In particular, the first support arm 190 can comprise a central body 200 that extends outward from the pivot end 192 between the retention ears 194, 196. The first and second retention ears can extend out from the pivot end 192 of the first support arm 190 in the same direction as the central body 200. The central body 200 can have a length $L_{CB}$ that is greater than a length $L_{RE}$ of the retention ears 194, 196, so that the central body 200 extends farther outward than the retention ears 194, 196. The central body 200 can have a sloped insertion end 195 to help facilitate the insertion of the first support arm 190 into a floor receptacle of a fluid containment apparatus as described above.

Each retention ear 194, 196 is cantilevered and can be secured to or integral with the pivot end 192 at a cantilevered end 194A, 196A with each retention ear 194, 196 spaced apart from and extending along opposing sides of the central body 200 so that a free end 194B, 196B that is distal to the respective cantilevered end 194A, 196A is compressible inward toward the central body 200. The first retention ear 194 can comprise an exterior edge 194C and the second retention ear 196 can comprise an exterior edge 196C. By being cantilevered, the free end 194B of the first retention ear 194 and the free end 196B of the second retention ear 196 are both compressible when a sufficient force is applied to the exterior edges 194C, 196C. The closer to the free end 194B, 196B that the force is applied to the exterior edge 194C, 196C, the less force is needed to compress the first retention ear 194 and the second retention ear 196.

As shown in FIGS. 15 and 17A, the first retention ear 194 can have an interior edge 194D that is spaced apart from and about parallel to the respective first edge 202 of the central body 200 forming a spacing $S_1$ therebetween. Similarly, the second retention ear 196 can also have an interior edge 204 of the central body 200 forming a spacing $S_2$ therebetween. In some embodiments, the interior edges 194D, 196D of the first and second retention ears 194, 196 can be about parallel to the respective first, and second edges 202, 204 of the central body 200. In some embodiments, the interior edges 194D, 196D of the first and second retention ears 194, 196 can extend at an angle with the respective first and second edges 202, 204 of the central body 200. For example, in some embodiments, the interior edges 194D, 196D of the first and second retention ears 34, 36 can extend at a slight angle of between about 1° and about 10° with the respective first and second edges 202, 204 of the central body 200.

In this manner, the first and second retention ears 194, 196 can be pushed or compressed inward toward the central body 200 by applying appropriate pressure on the exterior edges 1940, 196C at or near the free ends 194B, 196E of the respective first and second retention ears 194, 196. The first and second retention ears 194, 196 can comprise protrusions 198 that can extend outward at the exterior side edges 194C, 1960 at the free ends 194B, 196B. In some embodiments, the protrusions 198 can extend outward from the exterior edges 194C, 196C and the free ends 194B, 196B can each converge to a point at a tip 194E, 196E at the end of each of the protrusions 198 that, can facilitate insertion of the first support arm 190 into a floor receptacle of a fluid containment apparatus as described above.

The spacings $S_1$ and $S_2$ between each of the interior edges 194D, 196D of the first and second retention ears 194, 196 and the respective first and second edges 202, 204 of the central body 200 can be a distance that allows the protrusions 198 to be compressed inward to a distance so that the width of the first support arm 190 across the protrusions 198 of the first and second retention ears 194, 196 is less during compression as compared to when the first and second retention ears 194, 196 are uncompressed. In this manner, this compressed distance of the first and second retention ears 194, 196 can allow insertion and removal from the floor receptacles, described above, into which the first support arm 190 can be inserted.

Figure 17B:
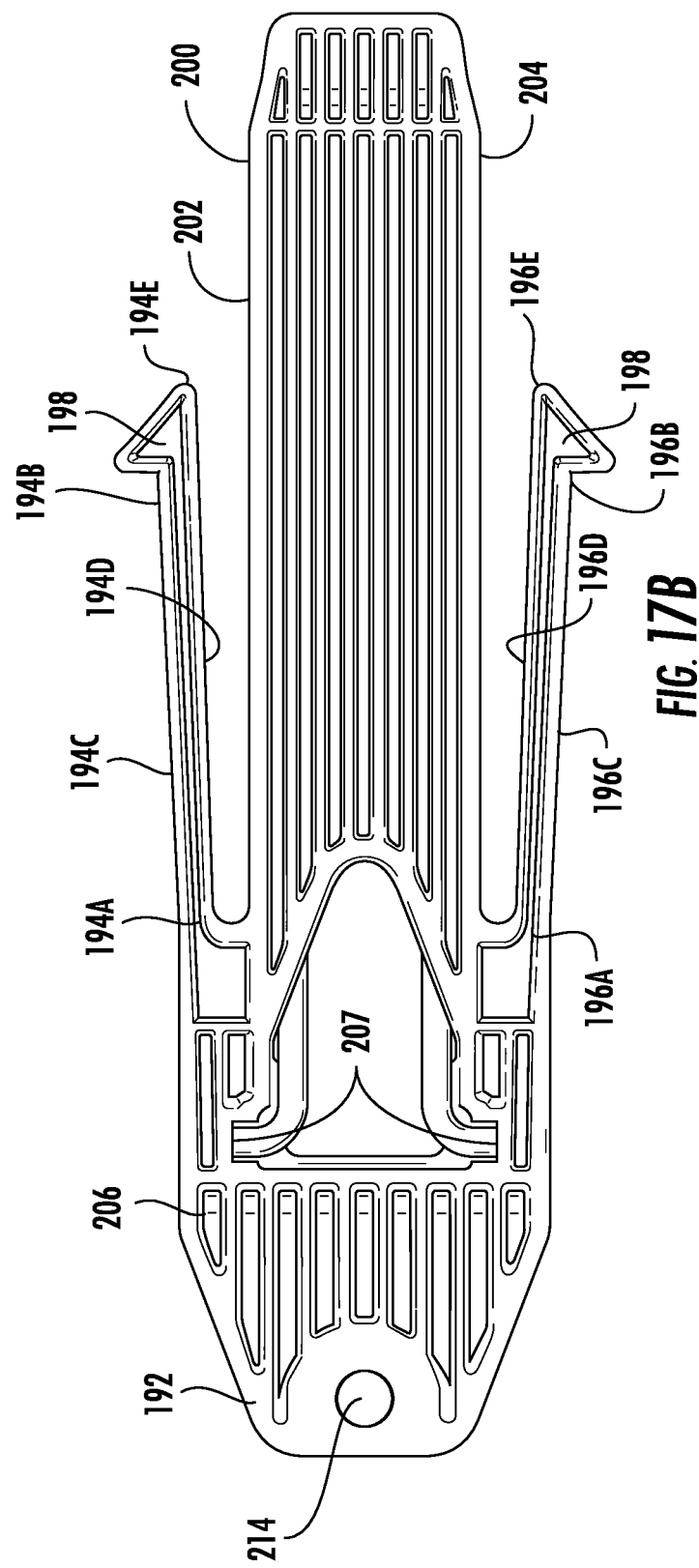
FIG. 17B illustrates a bottom plan view of the embodiment of the wall support according to FIG. 15 with the wall support in a collapsed position.

In some embodiments, as shown in FIGS. 15, 17A and 17B, the first support arm 190 can be formed as a single integral unit. For example, the central body 200, the pivot end 192, the retention ears 194, 196, and the base member 206 can be a single molded unit. In some embodiments, the first support arm 190 can comprise a plastic material that is generally rigid while allowing for some amount of flexibility. The first support arm 190 can comprise polyethylene or polyurethane in accordance with certain exemplary embodiments. However, it is to be understood that the second support arm 210 can be made out of various materials. In the embodiment shown, the second support arm 210 can comprise a metal such as aluminum or steel and can have a circular cross-section and a generally u-shape such that a central aperture is defined by the second support arm 210 and the first support arm 190. However, the second support arm 210 may be variously configured in accordance with other exemplary embodiments of the fluid containment apparatuses disclosed therein. The second support arm 210 can comprise a metal such as steel or aluminum, or may be made of plastic in certain exemplary embodiments.

The base member 206 can define one or more detents 208 that can hold the second support arm 210 when the second support arm 210 is in the second position 184. When a sufficient amount of force is applied to the second support arm 210, the second support arm 210 is forced out of one or more detents 208 so as, to pivot with respect to the base member 208 towards the first support arm 190. When the second support arm 210 is in the first position 182 and is subsequently moved back to the second position 184, sufficient force is applied to the second support arm 210 causing the second support arm 210 to be forced back into one or more receiving grooves 209 formed by the one or more detents 208 to be held therein.

The second support arm 210 can pivotally engage the base member 206 that comprises the pivot end 192 of first support arm 190 such that the pivoting second support arm 210 can move with respect to the first support arm 190. For example, the base member 206 can comprise apertures 207 that are aligned on opposing side of the base member 206 in which portions of the second support arm 210 are rotatably held. A reinforcing cross-brace 212 can optionally extend between the u-shaped portion of the second support arm 210 in order to strengthen the second support arm 210 at a desired location to ensure the desired amount of bending and bending location of the second support arm 210 is achieved. Although a single reinforcing cross-brace 212 is shown in FIGS. 15 and 17A, any number or none at all may be used in various exemplary embodiments.

The grooves 209 formed by the base member 208 and detents 208 can be curved such that curved outer surfaces of the second support arm 210 can be received therein. It is to be understood that the second support arm 210 can be variously arranged with respect to the base member 206 so as to be allowed to pivot with respect to the base member 206 and that the disclosed arrangement is only one possible option.

When in the supporting, or second, position 184, the second support arm 210 is retained by the detents 208 of the base member 206. The detents 208 function to hold the second support arm 210 in the initial supporting position 184 illustrated in FIGS. 15 and 16A. The pivot end 192 of the first support arm 190 can define a holding aperture 214 for receiving a fastener to secure the wall support 180 to the ground after insertions into side pockets and floor receptacles of a fluid containment apparatuses as described above.

Once it is desired to move the wall support 180 to the collapsed, or first, position 182, the detents 208 and the second support arm 210 are arranged to accommodate such repositioning. Application of a sufficient amount of force to the second support arm 210 can cause the second support arm 210 to be snapped out of the detents 208 and subsequently allowed to pivot with respect to the base member 206. In this arrangement, the base member 206 can be made of a material that has some degree of inherent flexibility to allow the detents 208 to flex an amount to permit the second support arm 210 to pass out of the grooves 209. The shape of the second support arm 210 in the embodiment shown can permit the second support arm 210 to flex. Thus, in some embodiments, the second support arm 210 may be removed from the grooves 209 via a combination of both flexing of the detents 208 and flexing of the second support arm 210. Once removed from the grooves 209, the second support arm 210 is free to be pivoted with respect to the base member 206 and the first support arm 190. In order to return the second support arm 210 to the supporting, or second, position 184, a return force can be applied that is sufficient to reinsert the second support arm 210 back into the grooves 209. The same mechanisms, flexing of the detents 208 in addition to, or alternatively, flexing of the second support arm 210, may be employed to return the second support arm 210 to the grooves 209. Other mechanisms or arrangements between the second support arm 210 and the base member 206 can be employed to maintain the orientation between these components and to also allow these components to move with respect to, one another.

For each wall support 180 used, the second support arm 210 of each wall support 180 can be inserted into a corresponding side wall receptacle of a fluid containment apparatus as described above and the first support arm 190 of each wall support 180 can be inserted into a corresponding floor receptacle of a fluid containment apparatus as described above with first and second retention ears 194, 196 of each first support arm 190 of the wall support 180 holding the respective first support arm 190 of the wall support 180 within the respective floor receptacle. In this manner, a fluid containment apparatus can have an upstanding side wall through the support of the wall supports 180.

Figure 18A:
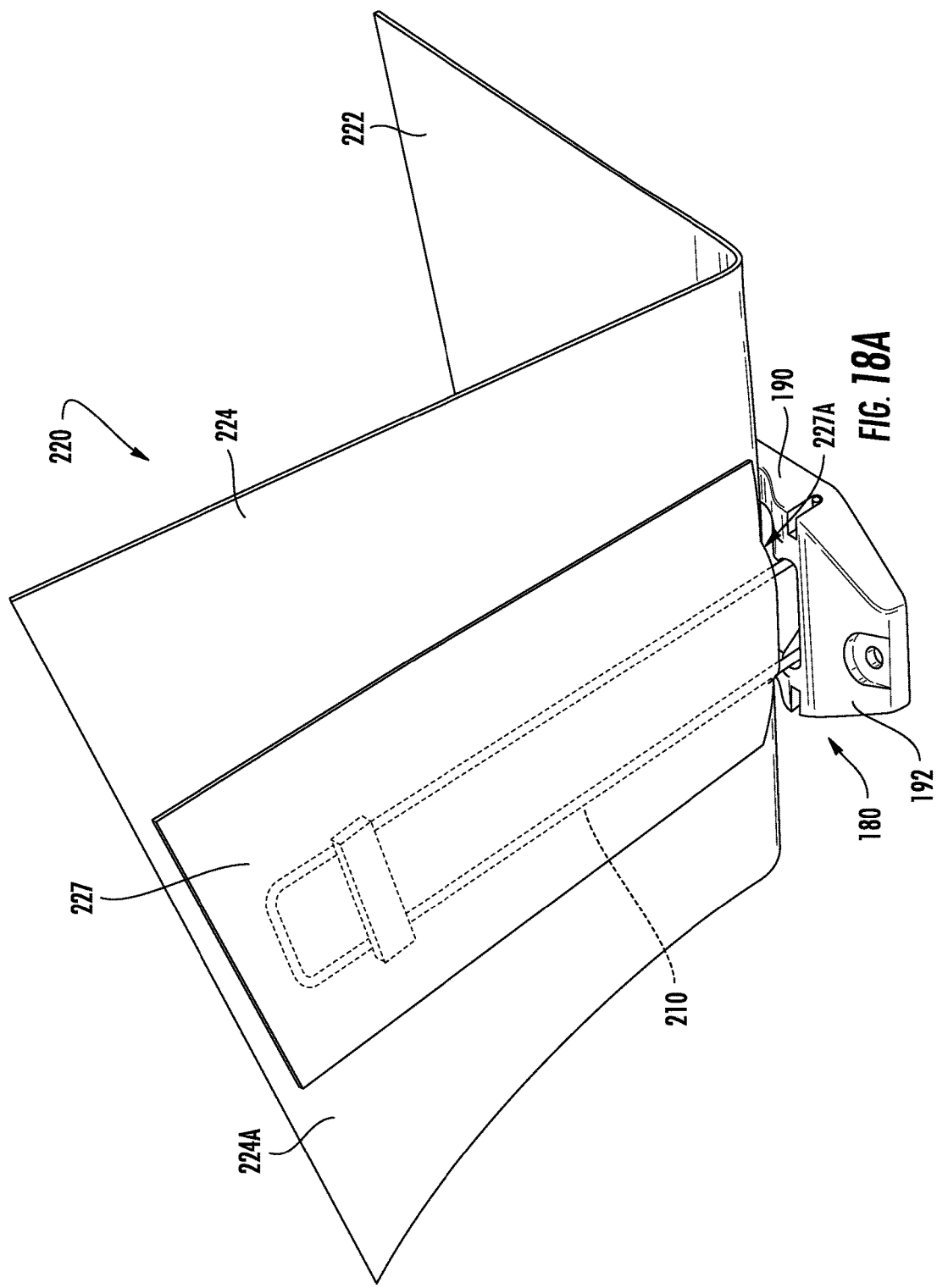
FIG. 18A illustrates a perspective view of a portion of a further embodiment of a fluid containment apparatus in accordance with the subject matter disclosed herein including a wall support according to FIG. 15.
Figure 18B:
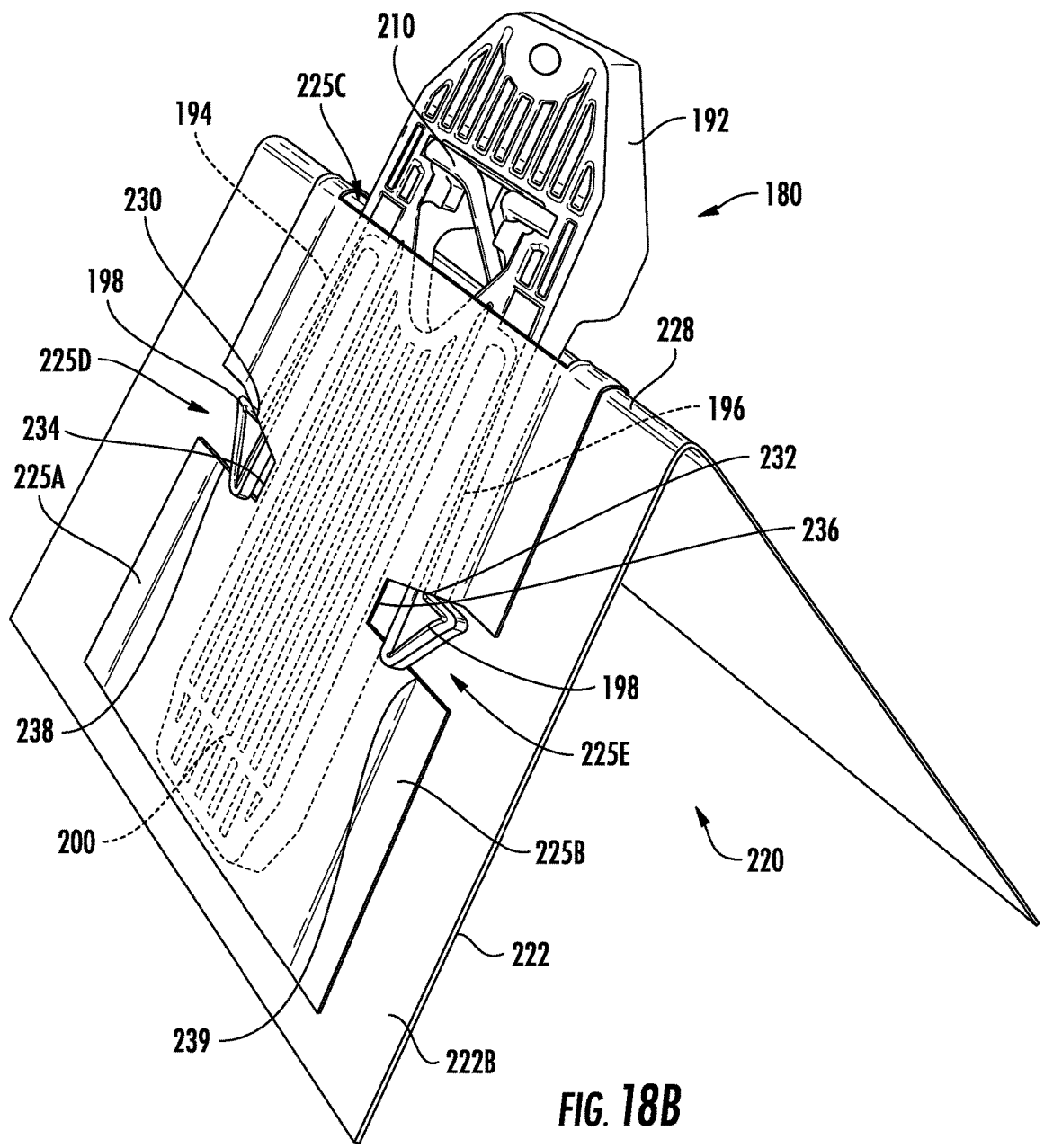
FIG. 18B illustrates a perspective view of an inverted portion of an embodiment of a fluid containment apparatus according to FIG. 18A including the wall support according to FIG. 15.

For example, the wall supports 180 can be used in a fluid containment apparatus similar to the embodiment of a fluid containment apparatus 220, portions of which are shown in FIGS. 18A and 18B. To facilitate the use of the wall supports 180, a fluid containment apparatus 220 can also comprise one or more floor receptacles 225 as shown in FIG. 18B that are disposed on the outer surface, such as a bottom surface 222B, of the floor 222 and one or more side wall receptacles 227 as shown in FIG. 18A disposed on an outer surface 224A of the side wall 224. Second support arms 210 of the wall supports 180 can be inserted into the side wall receptacles 227. The first support arms 190 of the wall support 180 can be inserted into corresponding floor receptacles 225 with the first retention ears 194 (and/or the second retention ears 196) of the first support arms 190 of the wall supports 180 holding the first support arms 190 of the wall supports 180 within the respective floor receptacles 225. The floor receptacles can comprise a variety of structures or combination of structures, including but not limited to one or more clips for receiving the retention ears of the first support arm, wide or narrow straps, pockets, one or more loops secured to the outer surface of the floor for receiving a portion of the support arm and/or the retention ears of the first support arm, or the like. In the embodiments shown in the figures, the floor receptacles can comprise floor pockets 225. The one or more floor pockets 225 that can be connected to a bottom surface 222B of a floor 222 of the fluid containment apparatus 220.

As shown in FIGS. 18A and 18B, each side receptacle 227 can be aligned with a corresponding floor receptacle 225. As with the floor receptacles, the side wall receptacles can comprise a variety of structures or combination of structures, including but not limited to one or more clips for receiving the second support arm, wide or narrow straps, pockets, one or more loops secured to the outer surface of the side wall for receiving a portion of the second support arm, or the like. In the embodiment shown in the FIG. 18A, the side wall receptacles can comprise side wall pockets 227. As shown in FIG. 18A, the one or more wall pockets 227 can be connected to the outer surface 224A of the side wall 224 with the side wall pockets 227 being aligned with and corresponding to the one or more floor pockets 225. When each wall support 180 is installed, the second arm 210 can be inserted in the side wall pocket 227 through an opening 227A that faces an outer perimeter 228 of the floor 222. Similarly, as shown in FIG. 18B, the first support arm 190 of each wall support 180 can be inserted into an opening 225C of a corresponding floor pocket 225 with the first retention ears 194, 196 of the first support arm 190 of the wall support 180 extending through openings 225D, 225E of the floor pocket 225 to hold the first support arm 190 of the wall support 180 within the respective floor pocket 225. The number of floor pockets 225 and side pockets 227 can correspond to the number of wall supports 180 that are intended to be used. In some embodiments, extra floor pockets 225 and side pockets 227 can be provided in case more wall supports 180 are needed for extra support. The floor pockets 225 and the side pockets 227 can have a similar construction as the floor and side pockets described above.

The structure of the specific floor pocket 225 will now be described in more detail. As shown in FIG. 18B, the fluid containment apparatus has been inverted to illustrate the structure and the operation of a floor pocket 225. The floor pocket 225 can have an opening 225C that faces the outer perimeter 228 of the floor 222 as well as openings 225D, 225E in two opposing sides 225A, 225B of the floor pocket 225 in some embodiments. The length $L_{RE}$ of the retention ears 194, 196 of the first support arm 190, the length $L_{CB}$ of the central body 200 of the first support arm 190 as well as the distance between the opposing sides 225A, 225B of the floor pocket 225 that are connected to the outer surface 222B of the floor 222 can allow the retention ears to be compressed upon initial insertion into the opening 225C that faces the outer perimeter 228 of the floor 222. Once the free ends of the retention ears 194, 196 enter the side openings 225D, 225E in the two opposing sides 225A, 225B, the size of the side openings 225D, 225E allow the retention ears 194, 196 become uncompressed. The uncompressed retention ears 194, 196 extend through the opposing side openings 225D, 225E after insertion of the first support arm 180 into the floor pocket 225 through the opening 225C facing the outer perimeter 228 of the floor 222 as shown in FIG. 18B.

In some embodiments, one or more edges of the side openings 225D, 225E in the two opposing sides 225A, 225B of the pocket 225 can be angled or slanted. For example, as shown in FIG. 18B, a bottom edge 230 of the side opening 225D and a bottom edge 232 of the side opening 225E can be angled downward. For instance, the bottom edge 230 of the side opening 225D can be slanted or angled downward from a side edge 234 of the side opening 225D toward the side 225A of the pocket 225, while the bottom edge 232 of the side opening 225E can be slanted or angled downward from a side edge 236 of the side opening 225E toward the side 225B of the pocket 225. These angled or slanted bottom edges 230, 232 that are the closest edges of the openings 225D, 225E to the opening 225C of the floor pocket 225 that faces the outer perimeter 228 of the floor 222 can help facilitate the insertion and removal of the protrusions of the retention ears 194, 196. Depending on the shape of the protrusions of the retention ears 194, 196, the bottom edges 230, 232 can have different angles and/or top edges 238, 239 of the respective openings 225D, 225E can be slanted or angled.

Figure 19:
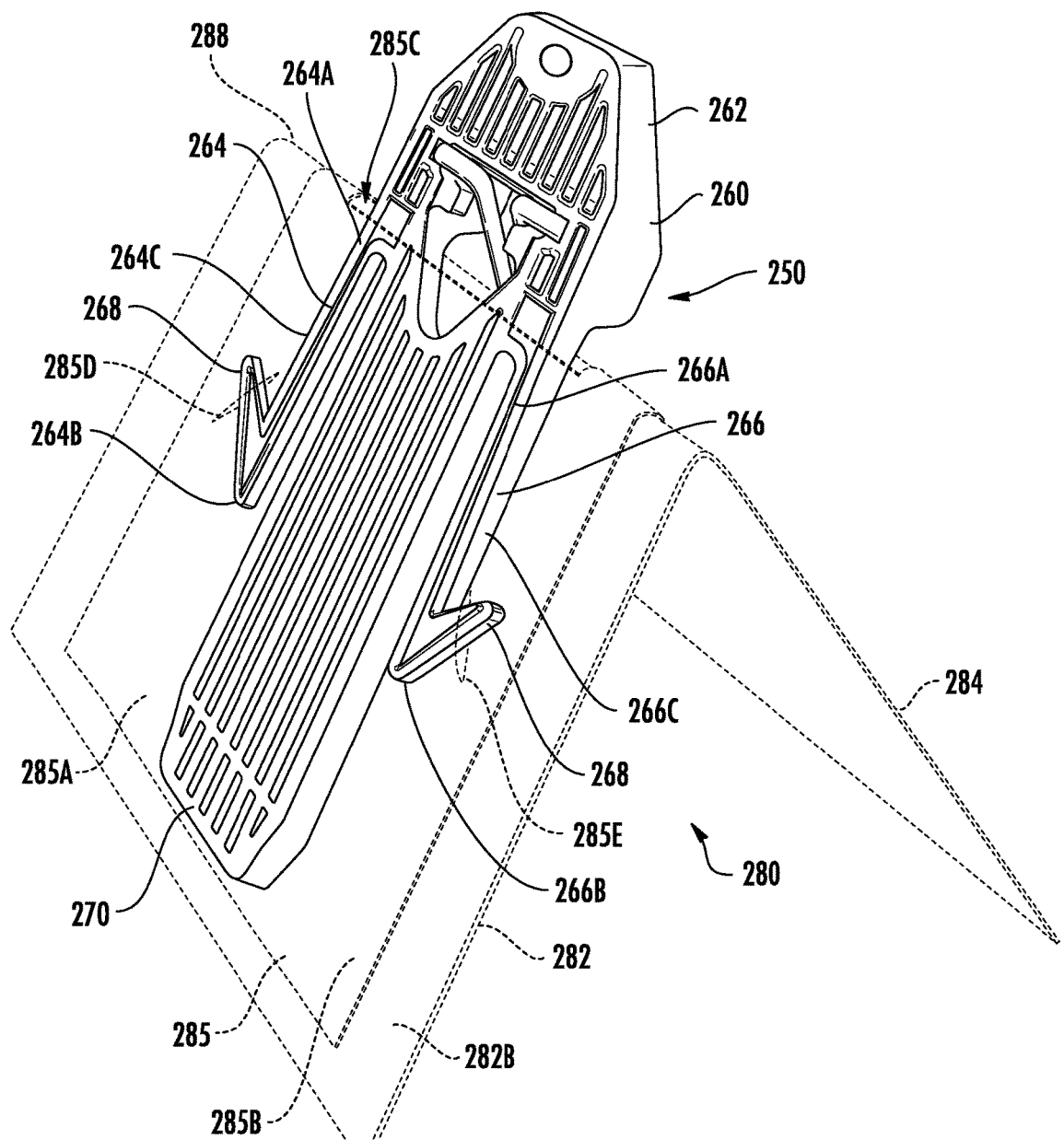
FIG. 19 illustrates a perspective view of an inverted portion of an embodiment of a fluid containment apparatus including an embodiment of a wall support in accordance with the subject matter disclosed herein.

FIG. 19 illustrates a bottom portion of another embodiment of a wall support 250 and a portion of a fluid containment apparatus 280 that can have one or more pockets 285. The wall support 250 can have a similar construction to the wall support 180 described above and shown in FIGS. 15-18B. The wall support comprise a first support arm 260 that can comprise a pivot end 262 and a first compressible retention ear 264 on an opposing side of the first support arm 250 from a second compressible retention ear 266. The first support arm 260 can also comprise a central body 270 that extends outward from the pivot end 262 between the retention ears 264, 266. The first and second retention ears 264, 266 can extend out from the pivot end 262 of the first support arm 260 in the same direction as the central body 270. In some embodiments as shown, the central body 270 can have a longer length than a length of the retention ears 264, 266, so that the central body 270 extends farther outward than the retention ears 264, 266.

Each retention ear 264, 266 is cantilevered and can be secured to or integral with the pivot end 262 at a cantilevered end 264A, 266A with each retention ear 264, 266 spaced apart from and extending along an opposing side of the central body 270 so that a free end 264B, 266B that is distal to the respective cantilevered end 264A, 266A is compressible inward toward the central body 270. The first retention ear 264 can comprise an exterior edge 264C and the second retention ear 266 can comprise an exterior edge 266C. By being cantilevered, the free end 264B of the first retention ear 264 and the free end 266B of the second retention ear 266 are both compressible when a sufficient force is applied to the exterior edges 264C, 266C. The first and second retention ears 264, 266 can comprise protrusions 268 that can extend outward at the exterior side edges 264C, 266C at or near the free ends 264B, 266B. As shown in FIG. 19, in some embodiments, the protrusions 268 can be barbs, such as angled or curved barbs. For example, the protrusions 268 can be angled or curved downward from at or near the free ends 264B, 266B of the respective first and second retention ears 264, 266 as shown in FIG. 19.

The fluid containment apparatus 280 is shown in dashed lines. The fluid containment apparatus 280 can comprise a floor 282 and a side wall 284. The fluid containment apparatus 280 can comprise one or more floor pockets 285 into which first support arms 260 of corresponding wall supports 250 can be inserted and one or more side wall pockets (not shown) into which the second support arms (not shown) of the corresponding wall supports 250. As shown in FIG. 19, the fluid containment apparatus 280 has been inverted to illustrate the structure and the operation of a floor pocket 285. The floor pockets 285 can be disposed on a bottom surface 282B of the floor 282. Each floor pocket 285 can be secured to the bottom surface 282B of the floor 282 at least along two opposing sides 285A, 285B. Each floor pocket 285 can have an opening 285C facing an outer perimeter 288 of the floor 282. Each floor pocket 285 can have slanted slot openings 285D, 285E that extend through the floor pocket 285. The uncompressed retention ears 264, 266 can extend through a corresponding slanted slot opening 285D, 285E after insertion of the first support arm 260 into the floor pocket 285 through the opening 285C facing the outer perimeter 288 of the floor 282. In particular, the angled or curved protrusions 268 can extend through the corresponding slanted slot opening 285D, 285E. Each of the slanted slot opening 285D, 285E can extend inward from an upper end proximal to the respective side 285A, 285B of the pocket 285 toward a central portion of the pocket 285. In particular, in some embodiments, the angle or the slant of the slanted slot opening 285D, 285E can in direction counter to the direction in which the respective protrusions 268 are angled or slanted. In such a configuration, at least a portion of the protrusions 268 can extend through the corresponding slanted slot openings 285D, 285E and can create an engagement that can limit or prevent the removal of the first support arm 260 from the pocket 285 without tearing the pocket unless the retention ears 264, 266 are compressed.

Other similar pocket and protrusion configurations can be used to facilitate the holding of a first support of a wall support within a respective floor pocket of a fluid containment apparatus. In some embodiments, a special tool can be used to compress the retention ears to remove them from the floor pocket, or other floor receptacle.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed:
1. A fluid containment apparatus, comprising:
a floor having an outer surface that extends to an outer perimeter;
a side wall that extends upward from the outer perimeter of the floor to at least partially define a containment area for fluid, the side wall having an outer surface;
a wall support that supports the side wall, the wall support comprising a first support arm having a pivot end and a laterally compressible first retention ear and a second support arm pivotally secured to the pivot end of the first support arm, the second support arm being pivotably moveable between a first position proximate to the first support arm to a second position where the second support arm is at an angle relative to the first support arm;
a floor receptacle disposed on the outer surface of the floor and a side wall receptacle disposed on the outer surface of the side wall with the side wall receptacle being aligned with the floor receptacle; and
the second support arm of the wall support insertable into the side wall receptacle and the first support arm of the wall support insertable into the floor receptacle with the first retention ear of the first support arm of the wall support holding the first support arm of the wall support within the floor receptacle.

2. The fluid containment apparatus according to claim 1, wherein the first support arm of the wall support comprises a second retention ear on an opposing side of the first support arm from which the first retention ear extends.

3. The fluid containment apparatus according to claim 1, wherein the first retention ear comprises a first laterally compressible retention ear on a side of the first support arm and the first support arm further comprises a second laterally compressible retention ear on an opposing side of the first support arm from which the first retention ear extends.

4. The fluid containment apparatus according to claim 3, wherein the floor receptacle comprises a floor pocket connected to an outer bottom surface of the floor on at least two opposing sides of the floor pocket and the side wall receptacle comprises a side wall pocket connected to an outer surface of the side wall with the side wall pocket being aligned with the floor pocket.

5. The fluid containment apparatus according to claim 4, wherein the floor pocket has an opening facing the outer perimeter and openings in the two opposing sides of the floor pocket, the uncompressed retention ears extending through a corresponding one of the opposing side openings after insertion of the first support arm into the floor pocket through the opening facing the outer perimeter.

6. The fluid containment apparatus according to claim 5, wherein the floor pocket comprises:
a foot end comprising a front edge and two opposing sides, the foot end positioned adjacent the outer perimeter of the floor with the two opposing sides of the foot end being secured to the bottom surface of the floor and the front edge forming the opening facing the outer perimeter;
a head end comprising a back edge and two opposing sides, the back edge and the two opposing sides of the head end being secured to the bottom surface of the floor; and
a neck having two opposing side and connecting the foot end and the head end of the floor pocket, the two opposing side of the neck not being secured to the bottom surface of the floor and forming the openings in the two opposing sides of the floor pocket.

7. The fluid containment apparatus according to claim 3, wherein the floor pocket has an opening facing the outer perimeter and slanted slot openings through the floor pocket, the uncompressed retention ears extending through a corresponding one of the slanted slot openings after insertion of the first support arm into the floor pocket through the opening facing the outer perimeter.

8. The fluid containment apparatus according to claim 3, further comprising opposing clips secured to the bottom surface of the floor into which the first and second retention ears are insertable, the opposing clips being aligned with each other at a distance from each other such that as the retention ears are inserted between the clips that retention ear are compressed to create a frictional holding force to secure the first support arm to the floor.

9. The fluid containment apparatus according to claim 8, wherein the opposing clips reside within the floor receptacle.

10. The fluid containment apparatus according to claim 1, wherein the first support arm comprises a body to which the pivot end is secured and a head secured to the body by a neck that extends between the head and the body with the first retention ear comprising a first laterally compressible retention ear cantilevered from the head and extending along a first side edge of the neck toward the body, the first support arm further comprising a second laterally compressible retention ear cantilevered from the head and extending along a second side edge of the neck toward the body.

11. The fluid containment apparatus according to claim 1, wherein the first support arm comprises a central body extending outward from the pivot end, the central body having a first side edge and a second side edge with the first retention ear comprising a first laterally compressible retention ear cantilevered from the pivot end and extending outward along the first side edge of the central body, the first support arm further comprising a second laterally compressible retention ear cantilevered from the pivot end and extending outward along the second side edge of the central body.

12. The fluid containment apparatus according to claim 11, wherein each of the first and second retention ears has an interior edge that are spaced apart from respective first and second side edges of the central body.

13. The fluid containment apparatus according to claim 1, wherein the pivot end comprises a base member that is secured to a body of the first support arm and the second support arm is hinged to the base member so that the second support arm pivots with respect to the base member, the base member defining a detent that holds the second support arm when the wall support is in the second position, and, when a sufficient amount of force is applied to the second support arm, the second support arm being forced out of the detent so as to pivot with respect to the base member towards the first support arm.

14. A wall support for a liquid containment apparatus comprising:
a first support arm comprising a pivot end and a first retention ear; and
a second support arm pivotally secured to the pivot end of the first support arm, the second support arm being pivotably moveable between a first position proximate to the first support arm and a second position where the second support arm is at an angle greater than 0° relative to the first support arm;
the pivot end comprising a base member that is secured to a body of the first support arm and the second support arm is hinged to the base member so that the second support arm pivots with respect to the base member, the base member defining a detent that holds the second support arm when the wall support is in the second position, and, when a sufficient amount of force is applied to the second support arm, the second support arm being forced out of the detent so as to pivot with respect to the base member towards the first support arm.

15. The wall support according to claim 14, wherein the first support arm comprises a second retention ear on an opposing side of the first support arm from which the first retention ear extends.

16. The wall support according to claim 14, wherein the first retention ear comprises a first laterally compressible retention ear on a side of the first support arm and the first support arm further comprises a second laterally compressible retention ear on an opposing side of the first support arm from which the first retention ear extends.

17. A wall support for a liquid containment apparatus comprising:
   a first support arm comprising a pivot end and a first retention ear; and
   a second support arm pivotally secured to the pivot end of the first support arm, the second support arm being pivotably moveable between a first position proximate to the first support arm and a second position where the second support arm is at an angle greater than 0° relative to the first support arm; and
   the first support arm comprising a central body extending outward from the pivot end, the central body having a first side edge and a second side edge with the first retention ear comprising a first laterally compressible retention ear cantilevered from the pivot end and extending outward along the first side edge of the central body, the first support arm further comprising a second laterally compressible retention ear cantilevered from the pivot end and extending outward along the second side edge of the central body.

18. The wall support according to claim 14, wherein each of the first and second retention ears comprises a cantilevered end, a free end and an exterior edge, each of the first and second retention ears having protrusions on the free ends.

19. The wall support according to claim 14, wherein the first support arm comprises a body to which the pivot end is secured and a head secured to the body by a neck that extends between the head and the body with the first retention ear comprising a first laterally compressible retention ear cantilevered from the head and extending along a first side edge of the neck toward the body.

20. The wall support according to claim 19, wherein the first support arm further comprising a second laterally compressible retention ear cantilevered from the head and extending along a second side edge of the neck toward the body.

* * * * *